(12) United States Patent
Hill

(10) Patent No.: US 9,192,148 B1
(45) Date of Patent: Nov. 24, 2015

(54) APPARATUS FOR FEEDING BIRDS

(71) Applicant: David S. Hill, San Antonio, TX (US)

(72) Inventor: David S. Hill, San Antonio, TX (US)

( * ) Notice: Subject to any disclaimer, the term of this patent is extended or adjusted under 35 U.S.C. 154(b) by 0 days.

(21) Appl. No.: 14/455,092

(22) Filed: Aug. 8, 2014

Related U.S. Application Data

(63) Continuation of application No. 13/784,392, filed on Mar. 4, 2013, now Pat. No. 8,893,659, which is a continuation-in-part of application No. 13/092,285, filed on Apr. 22, 2011, now Pat. No. 8,387,567.

(60) Provisional application No. 61/326,736, filed on Apr. 22, 2010.

(51) Int. Cl.
*A01K 39/00* (2006.01)
*A01K 39/02* (2006.01)

(52) U.S. Cl.
CPC .................... *A01K 39/0206* (2013.01)

(58) Field of Classification Search
CPC .. A01K 39/0206; A01K 1/0356; A01K 39/00
USPC .......................................................... 119/72
See application file for complete search history.

(56) References Cited

U.S. PATENT DOCUMENTS

| | | | | |
|---|---|---|---|---|
| 3,125,069 | A * | 3/1964 | Fowler | 119/77 |
| 3,990,403 | A * | 11/1976 | Jacobs | 119/72.5 |
| 4,026,244 | A * | 5/1977 | Salick | 119/57.8 |
| 4,558,662 | A * | 12/1985 | Peterson | 119/77 |
| 5,025,753 | A * | 6/1991 | Schneider | 119/51.03 |
| 5,353,742 | A * | 10/1994 | Mauritz | 119/77 |
| 5,447,118 | A * | 9/1995 | Huff et al. | 119/477 |
| 5,479,881 | A * | 1/1996 | Lush et al. | 119/57.8 |
| 5,740,759 | A * | 4/1998 | Cummings | 119/72 |
| 6,390,022 | B1 * | 5/2002 | Eichler et al. | 119/72 |
| 6,712,236 | B1 | 3/2004 | McGill | |
| 7,093,562 | B2 | 8/2006 | Smothers | |
| 7,156,050 | B2 * | 1/2007 | Scott et al. | 119/431 |
| 7,448,347 | B2 | 11/2008 | Richmond | |
| 7,565,881 | B2 * | 7/2009 | Smothers | 119/72 |
| 7,748,347 | B2 * | 7/2010 | Richmond | 119/72 |
| 7,958,845 | B2 * | 6/2011 | Gardner | 119/77 |
| 8,001,931 | B2 * | 8/2011 | Deese et al. | 119/61.57 |
| 8,146,534 | B1 * | 4/2012 | Robertson | 119/61.54 |
| 8,291,861 | B2 * | 10/2012 | Hepp et al. | 119/65 |
| 2003/0026164 | A1 | 2/2003 | Klein | |
| 2005/0126503 | A1 | 6/2005 | Fort | |
| 2005/0139645 | A1 | 6/2005 | Shean et al. | |
| 2006/0037544 | A1 | 2/2006 | Hunter | |
| 2006/0090707 | A1 | 5/2006 | Donegan | |
| 2009/0188434 | A1 | 7/2009 | McMullen | |

(Continued)

OTHER PUBLICATIONS

Gardman Wild Bird; Hummingbird Feeder with Nectar 3Pack—Part#:BA05805; http://ozbo.com/507632-Hummingbird-Fdr-W-Nectar-Pack.html BA05805, accessed Sep. 16, 2010.

(Continued)

*Primary Examiner* — Yvonne Abbott-Lewis
(74) *Attorney, Agent, or Firm* — Marcus Benavides

(57) ABSTRACT

A feeding apparatus for use in dispensing feed formula to hummingbirds or other animals. The apparatus comprises a reservoir containing a ready-to-consume and preservative free feed solution for birds. The walls of the reservoir are made of a metal layer and a paper or plastic layer to provide a barrier to light, oxygen, and flavor to maintain the feed solution in a substantially sealed environment.

20 Claims, 18 Drawing Sheets

(56) References Cited

U.S. PATENT DOCUMENTS

2009/0283046 A1 11/2009 Black
2010/0192866 A1 8/2010 McMullen
2012/0183642 A1 7/2012 Olmos

OTHER PUBLICATIONS

Petco; Petco Hummingbird Nectar; http://www.petco.com/product/14435/PETCOHummingbird-Nectar.aspx?cm_mmc=CSEMGooglebase-_-Wild%20Bird-_-PETC0-_- 1008307 &mr:trackingCode=31791416-8381-DE11-B7F3-0019B9C043EB &mr:referrallID=NA, accessed Sep. 16, 2010.
QCV; Hummingbird Nectar Ready-to-Use 2 Liter; http://www.qvc.com/qic/qvcapp.aspx/view.2/app.detail/params.aol_refer.false.tpl.detail.msn_refer.false.item.H177602.ref.GBA?cm_ven=Googlebase&cm_cat=For%20the%20Home&cm_pla=Outdoor%20Living&cm_ite=H177602, accessed Sep. 16, 2010.
Smithsonian Zoo; Hummingbird Nectar Recipe; http://nationalzoo.si.edu/scbi/migratorybirds/webcam/hummingbird_nectar_recipe.cfm, accessed Sep. 16, 2010.
Kordon LLC—Oasis—Bell Bottles; "Bell Bottle"; http://www.novalek.com/aosis/water_bottles/bell_bottle_8oz.htm, accessed Oct. 4, 2011.
Arcata Pet Supplies; "Oasis Bottle Hamster 8 oz"; http://ww.arcatapet.com/item.cfm?cat=1810, date appearing Mar. 30, 2011.
Wikipedia; "Aseptic processing"; May 14, 2009; Wikipedia.org.
USA Hardware.com; "Homestead Traditional Gem Disposable Humming bird Feeder, 16 Oz Capacity (Case: 6 Units)"; 2009; USA Hardware, Minneapolis MN.
Backyard Style.Com; "Traditional Nectar Gem Humming bird Feeder", 2009; accessed Apr. 22, 2011.
Amazon.Com; "Bird Brain 15622 Happy Hummer Window Mounted Hummingbird Feeder—Crackle Glass—Aqua Blue"; http://www.amazon.com/Bird-Brain-15622-Mounted-Hummingbird/dp/B000ZMCTQQ; 2009.
Perky-Pet; "Original Instant Liquid Nectar Concentrate for Hummingbirds"; Perky-Pet Products Co., Denver, Colorado, 2006.
Homestead; Nectar Gem Reusable Hummingbird Feeder; Gardner Equipment Company, Inc., Homestead Div., Juneau, Wisconsin, 2003.
Lowe's; "Your search for hummingbird feeder returned the following:"; Lowe's (LF LLC). http://www.lowes.com/SearchCatalogDisplay?storeId=10151&langId=-1 &catalogId=1005..., 2012.
Capri-Sun; "Our Drinks—Product range and nutrition information—Capri-Sun"; 2010. http://capri-sun.co.uk/mums/product-info/index.php.
Nature and Home; "Hummingbird King"; Nature and Home; 2009. http://web.archive.org/web/20100417111928/http://www.natureandhome.com/_product_7.
Tetra Pak; "The Future of the Stand-up Pouch and The Evolution of Tetra Wedge Aseptic Fiber Pouch Into New Markets"; Tetra Pak Inc, Vernon Hills, IL; Nov. 2004.
Homestead; "Nectar Gem Hummingbird Feeding System"; Gardner Equipment Company; 2008; http://web.archive.org/web/20090401105231/http://www.nectargem.com/.
Homestead; "Laboratory Study"; Gardner Equipment Company; 2009. http://web.archive.org/web/20090401070358/http://www.nectargem.com/study.html.
USPTO Office Action in U.S. Appl. No. 13/092,285, Jun. 11, 2011.
Borden, "Fat Free Skim Milk," Apr. 2011.
Amazon.Com; Humdinger Hummingbird Feeder,http://www.amazon.com/HumdingerHummingbird-Feeder-32oz/dp/B003BG1GRG, accessed Feb. 25, 2014.
Midland Hardware; Classic Brands LLC: 171175 Big Gulp Big Gulp Hummingbird Feeder 41; http://www.midlandhardware.com/171175.html, accessed Feb. 25, 2014.
Barn in the Sticks; Clear Hummingbird Food Easy Mixr; http://www.barninthesticks.com/clearhummingbird-food-easy-mix, accessed Feb. 25, 2014.
Cheer Pack; Innovative Complete Packaging Solutions; http://www.cheerpack.com/index.html, accessed Feb. 3, 2014.
Amazon.Com—Bird Brain, Happy Hummer on a Stake (Discontinued by Manufacturer); http://www.amazon.com/ . . .Brain-HummerDiscontinuedManufacturer/dp/B002GP5WPO/ref=sr_1_1?s=lawngarden&ie=U TF8&qid=1394637284&sr=1-1 &keywords=happy+hummer, accessed Mar. 12, 2014.
Droll Yankees; Happy Eight 2 Hummingbird Feeder; http://www.drollyankees.com/product/happy-eight-2-hummingbird-feeder/, accessed Jan. 27, 2014.
The Backyard Bird Company; Hummingbird Nectar Easy-Mix (Clear); http://www.backyardbird.com/Hummingbird-Nectar-Easy-Mix-Clear_p 691.html, accessed Feb. 25, 2014.
Backyard Bird Watcher; 24 oz Clear Hummingbird Nectar Easy Mix.; http://www.backyardbirdwatcher.com/hummingbirdfood.html, accessed Feb. 25, 2014.
The Zen Birdfeeder; 10 Questions for a Migrating Hummingbird and "FAQ—Do I Have to Boilthe Water to Make Hummingbird Nectar?"; http://wildbirdsunlimited.typepad.com/the_zen_birdfeeder/responsibility, dated Mar. 6, 2014 accessed on Mar. 18, 2014.
Shopwiki.Com; Selection of Bird Feeders from Stokes; http://www.shopwiki.com/d/774051/322542083/Stokes-Select-Bird-Feeder-Pole, accessed on Feb. 15, 2014.
Birdola: Hummingbird Nectar 16 oz. Concentrate; http://www.birdola.com/products/hummingbirdproducts/hummingbird-nectar-16-oz.aspx, accessed May 2014.
Birdola: Hummingbird Nectar Ready to Use; Birdola Products 1650 Broadway NW, Grand Rapids, MI 49504, May 2014.
Amcor: 8 oz. Retortable Paneled Bottle & Closure; http://www.amcor.com/products_services/8oz_Retort_Paneled_PET_bottle.html, indicates. Copyright 2014, accessed on Aug. 19, 2014.
Amcor: Amcor Rigid Plastic Stock Bottles, Amcor Rigid Plastics, 935 Technology Drive, Ann Arbor MI 48108, dated Oct. 2013, accessed at http://www.amcor.com/products_services/8oz_Retort_Paneled_PET_bottle.html on Aug. 19, 2014.

* cited by examiner

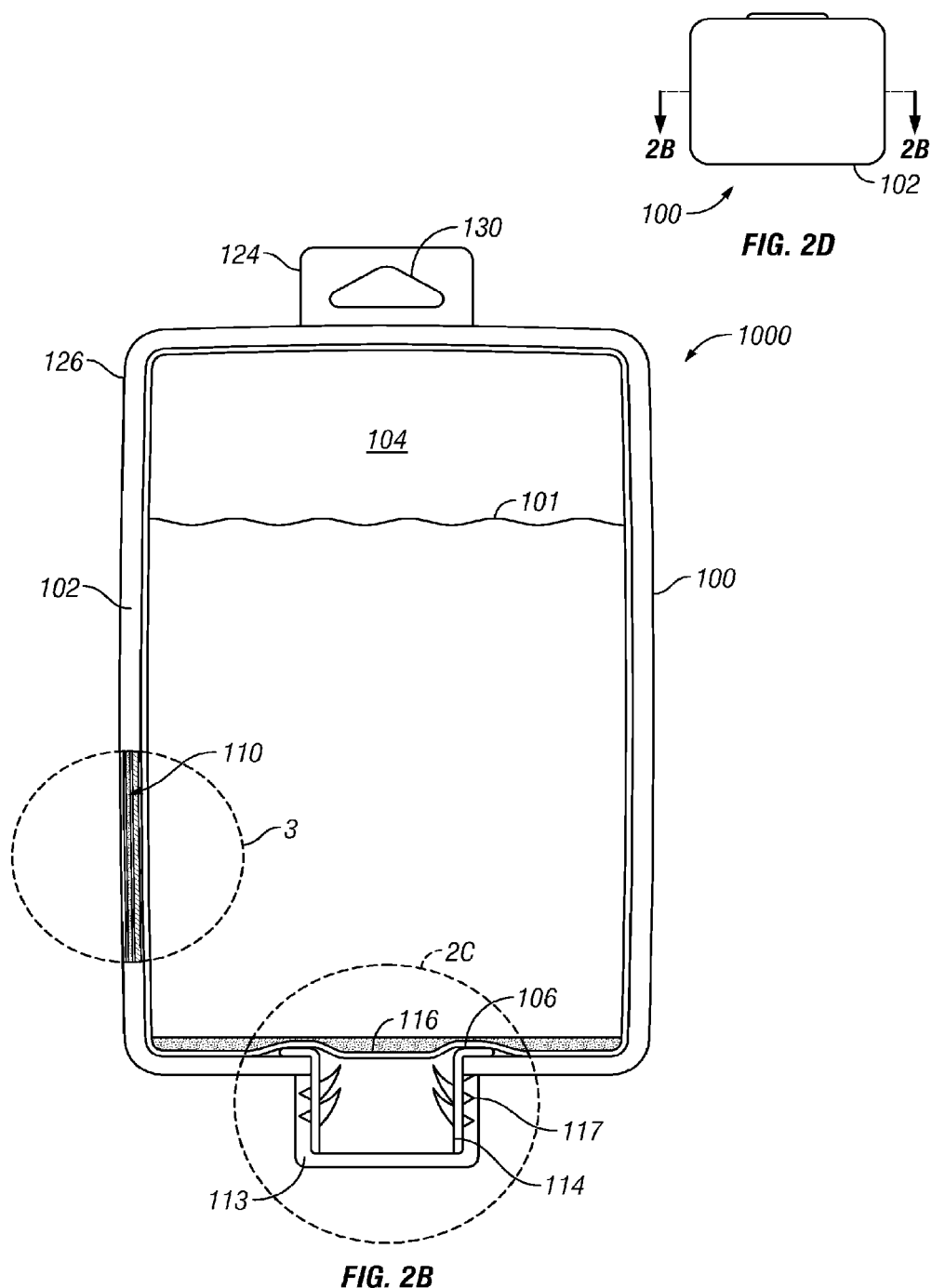

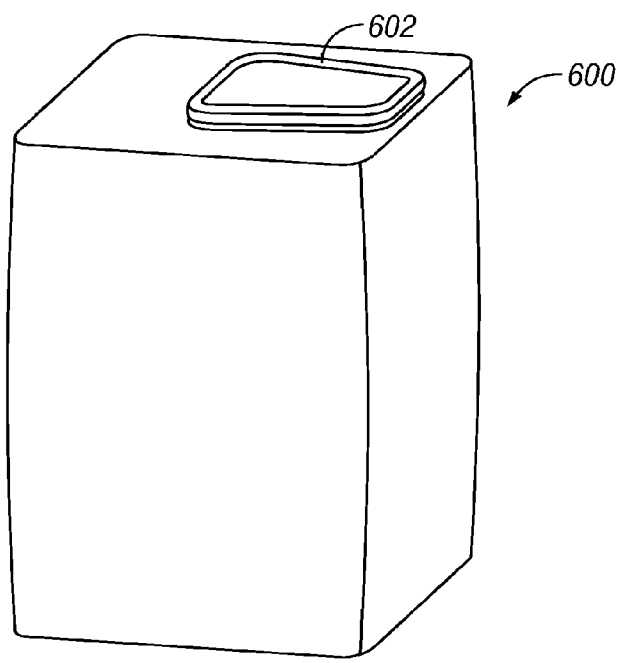
FIG. 16
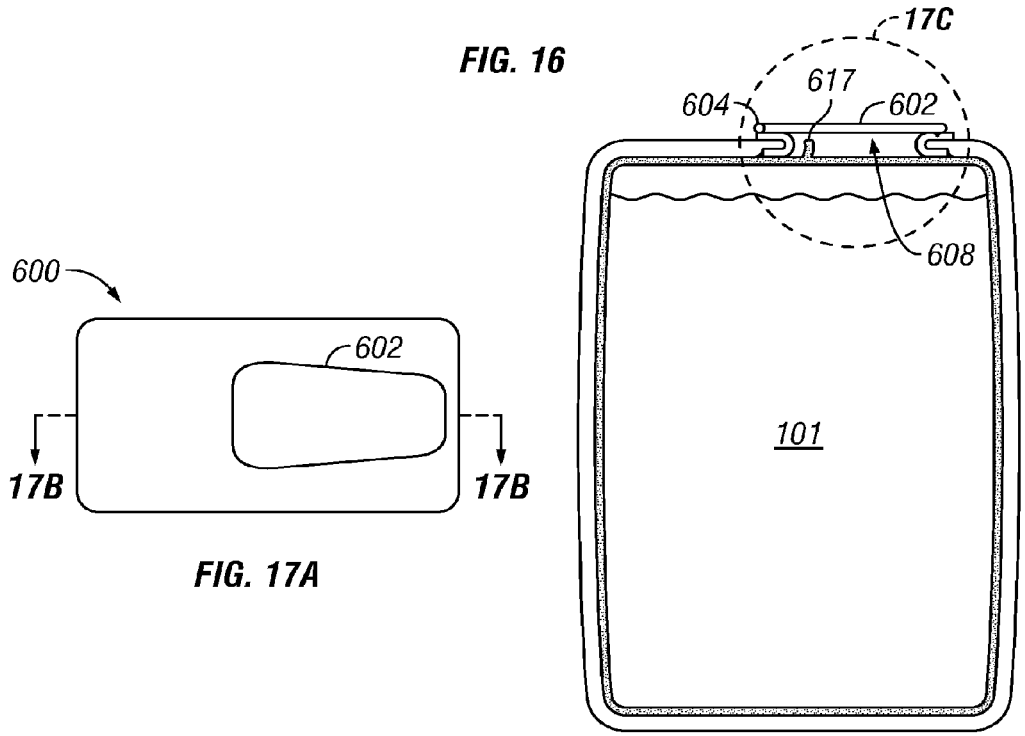
FIG. 17A
FIG. 17B

APPARATUS FOR FEEDING BIRDS

CROSS-REFERENCE TO RELATED APPLICATIONS

This application is a continuation of the pending prior application having Ser. No. 13/784,392 entitled HUMMINGBIRD FEEDING APPARATUS, filed on Mar. 4, 2013, the entire contents of which are incorporated herein by reference for all purposes. Prior application Ser. No. 13/784,392 is a continuation-in-part, and claims the benefit of the filing date of U.S. patent application Ser. No. 13/092,285 entitled HUMMINGBIRD FEEDING APPARATUS, filed Apr. 22, 2011, now issued as U.S. Pat. No. 8,387,567, which relates to, and claims the benefit of the filing date of, U.S. provisional patent application Ser. No. 61/326,736 entitled APPARATUS FOR FEEDING BIRDS, filed Apr. 22, 2010, the entire contents of which are incorporated herein by reference for all purposes.

BACKGROUND OF THE INVENTION

The present invention relates to feeders for animals and, more particularly, to feeders for hummingbirds. Hummingbird feeders are a source of enjoyment for bird and nature enthusiasts. A hummingbird feeder is typically a reservoir that dispenses or makes available a food source to a hummingbird, namely nectar. Nectar typically comprises a sugar and water solution.

It is generally known that hummingbirds like fresh nectar. Generally, hummingbirds are creatures of habit, returning to a feeder that previously had a fresh nectar supply. Thus, there is an interest among hummingbird feeder users to maintain a constant fresh supply of nectar.

Problems with the hummingbird feeders arise when the nectar is not fresh. Stale nectar deters hummingbirds from returning to the same location. Stale nectar may make a hummingbird sick. Insects may be attracted to fresh or spoiling nectar, which may exacerbate or accelerate spoilage and bring further risks to the health of hummingbirds.

These problems have been addressed in different manners. Sterilization of the water, by pre-boiling or other sterilization methods, is one way to ensure that the nectar stays fresh longer. Also, periodic replacement of the nectar in the feeder, such as once a week in cooler climates, also helps to maintain a fresh supply of nectar.

Preservatives that deter microbial or bacterial growth within the nectar have also been utilized. Preservatives have the advantage of extending shelf life of nectar sold in containers. Some types of preservatives include citric acid, sodium citrate, citrate, sodium benzoate, sorbic acid, tartaric acid, potassium sorbate, and bezoic acid.

But preservatives may also deter hummingbirds from feeding from nectar in a feeder, because the preservative may change the flavor and/or consistency of the nectar from that expected from a sugar-water solution. Also, preservatives may affect the digestive system in a particular hummingbird, further deterring that hummingbird from returning to feed from the feeder.

In addition, periodic replacement of the nectar in the hummingbird feeder is typically cumbersome and time-consuming for the user, often requiring additional cleaning of the hummingbird feeder before reintroducing a clean hummingbird feeder with fresh nectar to the hummingbirds.

Therefore, a need exists for an invention that can maintain the sterility of a nectar solution in a ready to use configuration, which requires little or no cleaning to keep the nectar fresher for longer periods of time than conventional packaging. Further, a need exists for a system for delivering nectar to the consumer in a substantially sterile or preservative-free state that exceeds that found in conventional packaging for hummingbird nectar solution.

SUMMARY OF THE INVENTION

The present invention provides a feeding apparatus for use in dispensing feed formula to hummingbirds or other animals, the feeder having a reservoir for holding ready to consume and preservative free nectar formula for hummingbirds. The reservoir comprises a metal layer and a paper or plastic layer.

BRIEF DESCRIPTION OF THE DRAWINGS

For a more complete understanding of the present invention and the advantages thereof, reference is now made to the following Detailed Description taken in conjunction with the accompanying drawings, in which:

FIG. 2B is a cross-sectional view of a second configuration of hummingbird feeding apparatus taken along line 2B-2B, shown in FIG. 2D;

FIG. 2D is a top view of the second configuration of hummingbird feeding apparatus;

FIG. 16 is a perspective view of a second refill package;

FIGS. 17A, 17B, and 17C are a top view, side cross-sectional view taken along line 17B-17B, and a close up view of section C of a second refill package;

DETAILED DESCRIPTION

In the following discussion, numerous specific details are set forth to provide a thorough understanding of the present invention. However, those skilled in the art will appreciate that the present invention may be practiced without such specific details. Additionally, for the most part, specific details and the like have been omitted inasmuch as such details are not considered necessary to obtain a complete understanding of the present invention, and are considered to be within the understanding of persons of ordinary skill in the relevant art.

Figure 1:
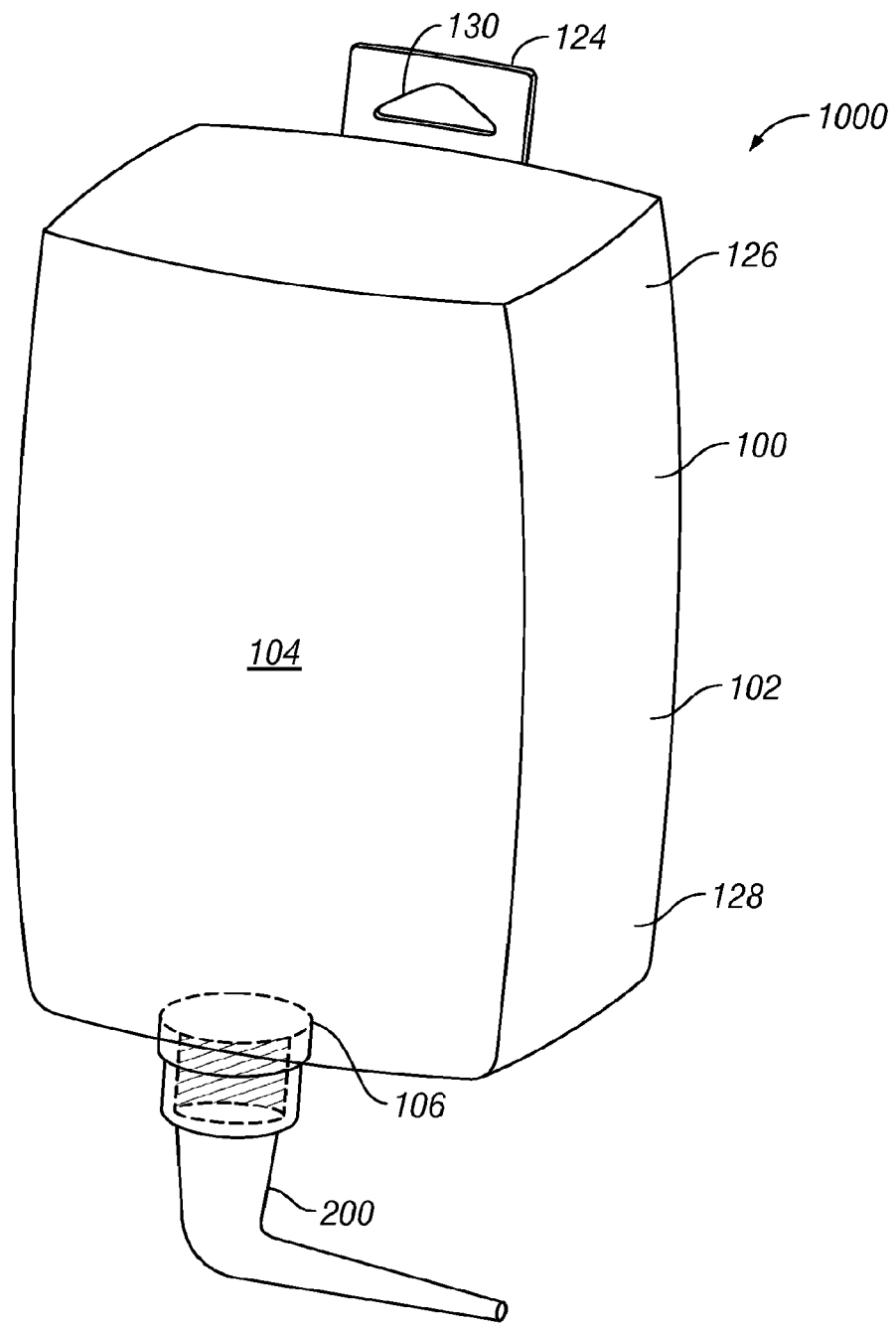
FIG. 1 is a perspective view of a first configuration of a hummingbird feeding apparatus.
Figure 2A:
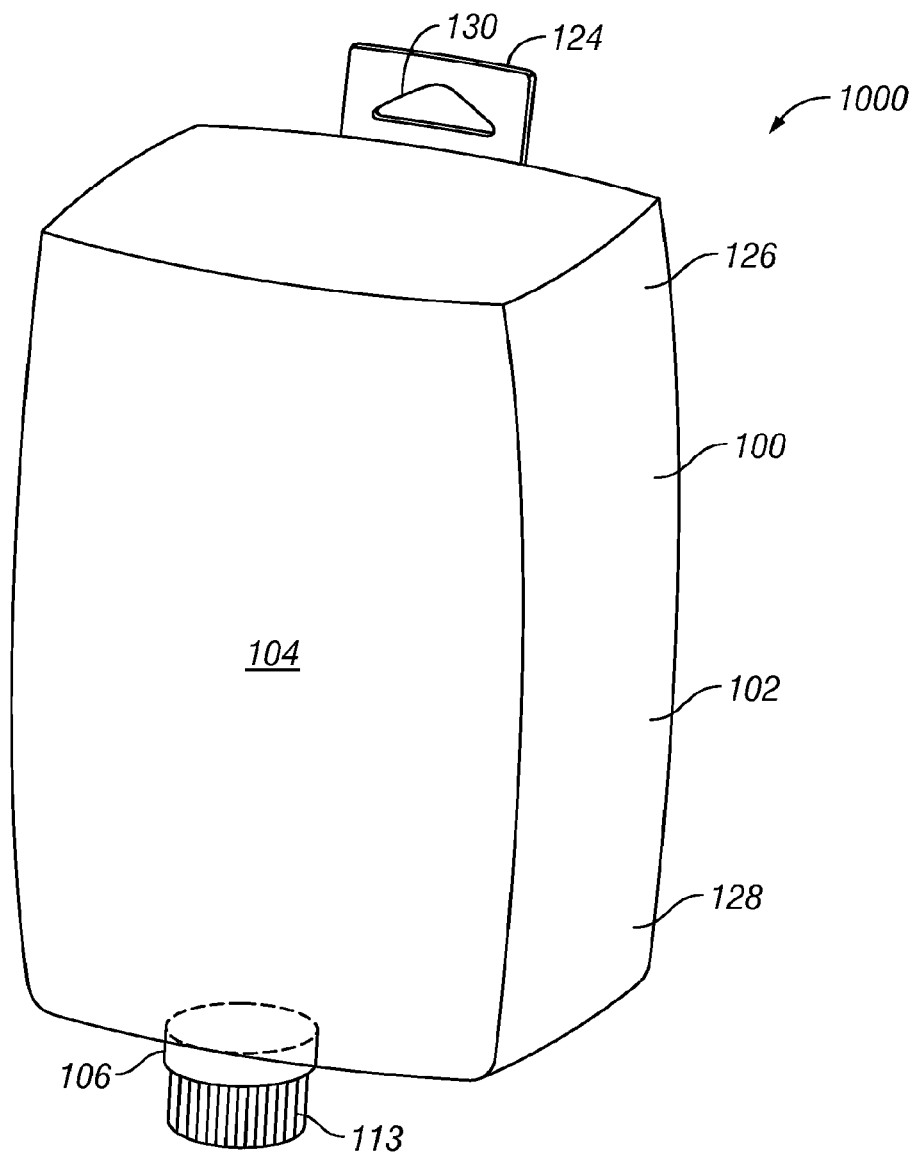
FIG. 2A is a perspective view of a second configuration of hummingbird feeding apparatus having a nozzle member removed.
Figure 2C:
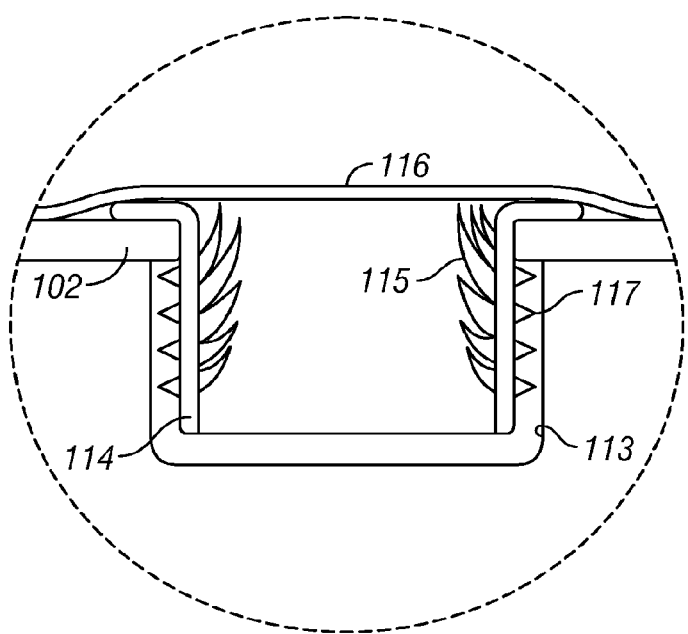
FIG. 2C is a close-up view of section "2C" shown in FIG. 2B.

As shown in FIG. 1, a feeding apparatus 1000 for feeding a bird or other animals may comprise a feeder 100 containing a formula adapted for feeding birds or other animals. The feeder 100 may be configured to couple to a dispensing member 200 for dispensing the formula to birds or animals. In some embodiments, the formula may be ready for consumption, without requiring the addition of any further materials, such as water, sugar or other ingredients. As shown in FIG. 2A, the feeder 100 may have a cap member 113 that may cover an opening 106 in the feeder 100.

The feeder 100 may comprise an aseptic or sterile enclosure having walls 102 forming a reservoir 104. The formula may be aseptically filled and packaged in the feeder 100 prior to arriving to the consumer. The formula may have been previously sterilized and aseptically packaged in the feeder 100 for storage in an aseptic environment, at least until one or more seals on the feeder are broken to dispense the formula to birds or other animals. For instance, the formula may be vacuum-packed in a microbe-free and sterile packing environment into an aseptic feeder for keeping the formula fresh for an extended period of time, for instance two years.

An aseptic or sterile enclosure may comprise a reservoir that contains a sterile product stored in a sterile container. The sterile product, such as hummingbird formula, is stored to maintain its sterility for an extended period of time to extend the shelf life of the product, where sterility may be defined as the condition of the product being substantially microbe and disease-free. The reservoir 104 of the feeder 100 shown in FIG. 1 may have walls 102 comprising layers of a combination of paper, plastic, foil, like aluminum foil, or other suitable materials.

Figure 3:
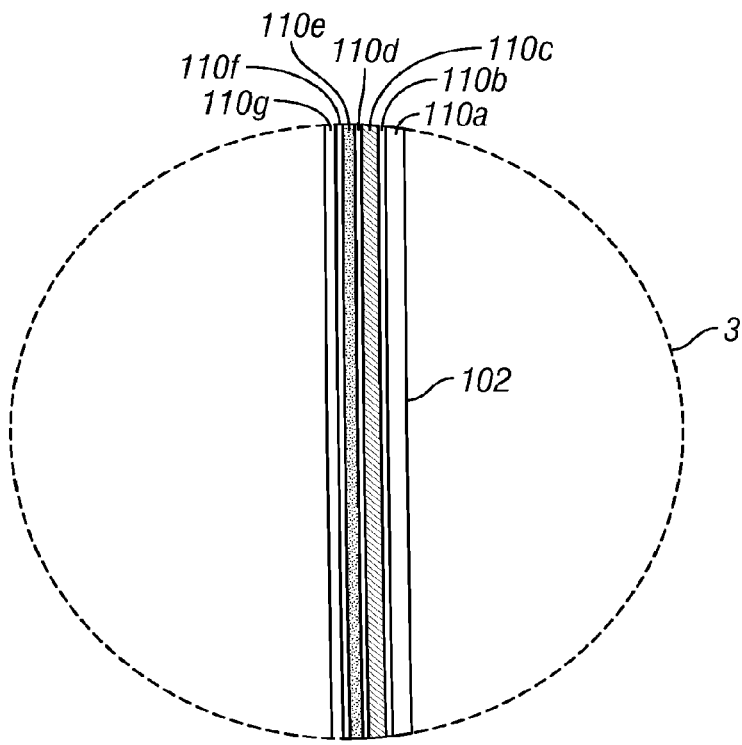
FIG. 3 is a close-up view of section "3" shown in FIG. 2B, showing layers in walls of a feeder.

As shown in FIGS. 2B and 3, the walls of the feeder 100 may comprise one or more layers 110 that accomplish and promote longer shelf life by protecting the contents from contaminants like microbes, bacteria, moisture, oxygen, light, and flavor. The reservoir 104 of the feeder 100 may be constructed according to the processes and manufacturing techniques of the aseptic packages produced by Tetra Pak Inc. of Vernon Hills, Ill., for instance under the registered trademark Tetra Prisma®.

The walls 102 may include a series of one or more layers 110 including, but not limited to, those shown in FIGS. 2B and 3. As shown in FIG. 3, these layers 110 may include a combination of one or more of a polyethylene layer 110a for sealing in the nectar formula 101, shown in FIG. 2A, a first polyethylene adhesion layer 110b, an aluminum foil layer 110c, a second polyethylene adhesion layer 110d, a paperboard layer 110e for providing structural stability and strength to the feeder and define an enclosed volume as a reservoir, a printed design and artwork layer 110f for labeling the feeder, and a second polyethylene layer 110g to protect the reservoir from external moisture.

In some embodiments, the layers 110 of the feeder 100 may comprise flexible materials that may be folded into a closed shape to configure the layers 110 to define a reservoir for holding nectar solution. One advantage of using flexible materials for the layers 116 may be that it allows for high-speed manufacturing, which may lower overall production costs.

It is expected that at least one layer of the walls 102 may comprise a substantial barrier to one or more of microbes, bacteria, moisture, oxygen, light or flavor. The layer 110c may comprise a low density metal, such as aluminum, that resists corrosion and provides a substantial barrier to light, oxygen and flavor. In the embodiment shown, the aluminum foil layer 110c may substantially prevent light from entering the reservoir to impact the nectar contained in the feeder 100. Preventing light from impacting the nectar may retard microbial growth within the reservoir 103, which may significantly extend the shelf-life of the nectar formula 101.

In is further expected that the aluminum foil layer 110c may assist in extending the time that the nectar stays fresh after at least one seal in the feeder 100 is broken and the nectar in the reservoir is exposed, at least partially, to the outside environment. A consumer may purchase the feeder 100 in a substantially sealed condition with the feeder 100 sealed by at least one seal, such as first sealing member 116, described below. After the seal is broken, the aluminum layer 110c may continue to substantially prevent light from impacting the nectar solution contained in the reservoir of the feeder 100, even though there may be some contamination as an expected part of breaking the seal. Therefore, the aluminum layer 110c and other suitable materials may maintain a substantially sealed condition, providing a relatively sterile environment, within the reservoir for a longer period of time, even after the seal of the feeder 100 is initially broken. In some embodiments, the dispensing member 200 may further assist in preventing contamination and stopping microbial growth by acting as at least a partial seal to entrance of air within the reservoir.

It will be understood other materials known by persons of ordinary skill in the art may be used in place of aluminum of layer 110c. These materials may accomplish substantially the same apparent benefits and advantages of aluminum, and may include tin, zinc, or other suitable material.

As shown in FIG. 2B, the feeder 100 may comprise an opening 106 on a bottom portion 13 of the feeder 100. The opening 106 may extend through the walls 102 of the feeder 100 allowing for nectar to be inserted or removed from the reservoir 104, in the absence of at least one seal that would close the opening 106.

A connection interface 112 may surround a portion of the opening 106 for coupling a dispensing member 200 to the feeder 100. The interface 112 may attach to and extend from the outside surface of the walls 102 of the feeder 100. The interface 112 may generally at least partially surround or enclose the opening 106, and may generally form a channel for connecting with a mouth of the interface 112 and the opening 106, shown in FIG. 1.

Figures 4A, 4B:
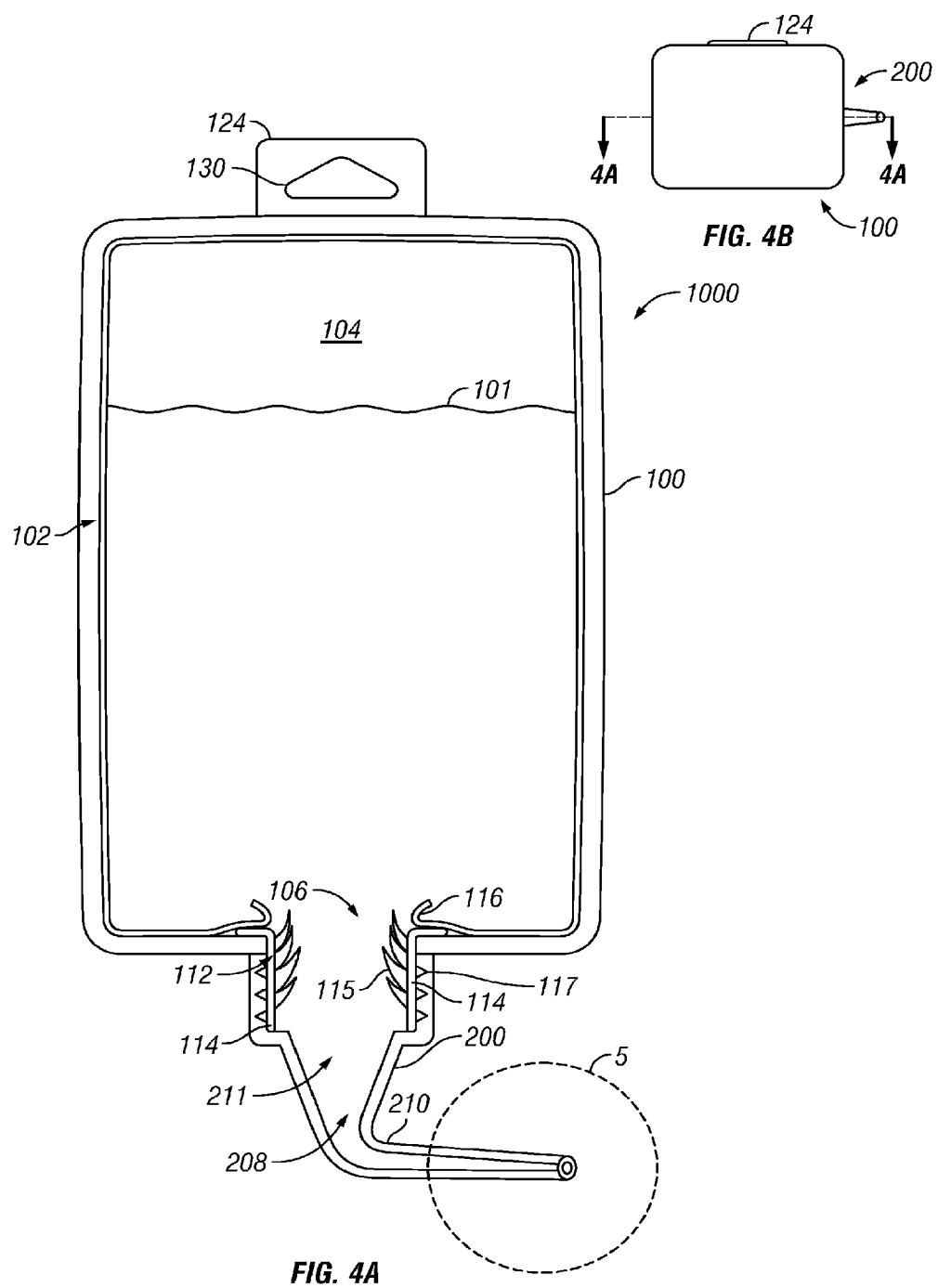
FIG. 4A is a cross-sectional view of a first configuration of a hummingbird feeding apparatus taken along line 4A-4A shown in FIG. 4B with the nozzle member coupled to the feeder.
FIG. 4B is a top view of the first configuration of a hummingbird feeding apparatus.

In the embodiment shown in FIGS. 2B and 4A, the interface 112 may comprise a boss 114 extending from the opening 106 having threading 117 on outside portions of the boss 114. The threading 117 may be configured to threadably couple to a cap member (shown in FIGS. 2A and 2B) or the dispensing member 200 (shown in FIG. 4) for allowing the nectar formula 101 to flow from the reservoir 104 through the interface 112 and to the dispensing member 200. The boss 114 may be manufactured from polypropylene or other suitable material. It will be understood by persons of ordinary skill in the art that the threaded coupling between the interface 112 and the dispensing member 200 may be interchanged with other structures and methods of coupling that will perform the same function as the threaded coupling, for instance snap or interference fits, latches, or clips.

The opening 106 may be sealed by a first sealing member 116. In the embodiment shown in FIG. 2B, the first sealing member 116 may cover the opening 106 to impede the flow of nectar formula 101 from the reservoir 104 through the interface 112 and to the dispensing member 200 and to at least partially seal the feeder from the outside environment, e.g. from air, light, bacteria, microbes, or animals. The first sealing member 116 may be configured to be breakable or removable to allow the consumer to open or unseal the feeder 100 for dispensing nectar formula 101 to birds or other animals.

Initially, the feeder 100 may be sealed from the outside atmosphere by the first sealing member 116. As shown in FIG. 2B, the first sealing member 116 may comprise a piece of aluminum foil, or other suitable material, extending from the walls 102 of the feeder 100 to cover the opening 106. In some embodiments, the first sealing member 116 comprises a portion of layer 110c that has been stripped of other layers 110 to expose the aluminum portion of walls 102.

The connection between the first sealing member 116 and the feeder 100 may be configured to allow the consumer to tear or break the first sealing member 116 from the feeder 100 with the application of a threshold level of pulling or puncturing force. The foil of the first sealing member 116 may be configured to be thin enough, as a membrane, to allow the consumer to puncture the membrane with application of a threshold level of piercing force. The boss 114 may at least partially cover and enclose both the opening 106 and the first sealing member 116 to prevent inadvertent displacement of the first sealing member 116.

A cap member 113 may couple to the boss 114 to substantially enclose both the opening 106 and the first sealing member 116 to prevent inadvertent displacement of the first sealing member 116. The cap member 113 may comprise a threaded sleeve that threadably engages the threading 117 on the boss 114. In some embodiments, the cap member 113 may be manufactured according to the methods and techniques of the StreamCap® (manufactured by TetraPak, Inc.). The cap member 113 may be made from polyethylene or other suitable material.

An opening member 115 on the cap member 113 may be configured to break the first sealing member 116 on the feeder 100 for the release of the formula from the reservoir. In some embodiments, the opening member 115 may be positioned on an inner surface of the boss 114. The opening member 115 may comprise teeth positioned on an inner surface of the boss 114 and configured to engage and break the first sealing member 116 on the interface 112, when the cap member is removed from threadable engagement with the threading 117 on the boss 114. In some embodiments, when the cap member 113 is turned in a counter clockwise direction the teeth of the opening member 115 may engage the first sealing member 116 to break the seal.

As shown in FIGS. 1, 2A, and 4, one or more attachment members, such as hanger members 124, may be coupled to a top portion 126 of the feeder 100 for connecting the feeder 100 to a hummingbird-accessible location. The hanger member 124, such as a tab, may be positioned on the top portion 126 of the feeder 100 generally opposite from the dispensing member 200, located generally on a bottom portion 128. The designations "top" and "bottom" are intended to signify that when in use the top portion 126 may be positioned higher relative to the local vertical than the bottom portion 128. Generally, the apparatus 1000 may be hung from a bird or animal accessible structure, like a tree outside, by a coupling between the hangar member 124 and a portion of the bird or animal accessible structure.

The hanger member 124 may be configured with an aperture 130 or hook (not shown) to receive or communicate with a hook member (not shown) on a bird or animal accessible structure for mounting the feeding apparatus 1000 in a place accessible to birds or other animals. The hangar member 124 is generally positioned on an opposite side of the feeder 100 from where the opening 106 is located for orienting the feeder 100 so that the dispensing member 200 is extending in a generally downward direction relative to the local vertical to allow gravity to assist in dispensing the formula from dispensing member 200. It will understood by persons of ordinary skill in the art that the aperture 130 of the hangar member 124, configured to receive a hook to couple the feeding apparatus 1000 to a bird or animal accessible structure, may be interchanged by other structures and methods that achieve the same function as an aperture, namely, for instance, latches, hooks, clips, nails, nut and bolts, suction cups and adhesives.

In some embodiments, the formula 101 contained in the feeder 100 comprises a ready to consume nectar solution of about 4 parts water and about 1 part sugar cane, specifically made to feed one or more hummingbirds. The feeder 100 may hold 500 ml of liquid and may comprise substantially an aseptic package manufactured by Tetra Pak Inc. of Vernon Hills, Ill. under the registered trademark Tetra Prisma®. In some embodiments, the formula 101 may be packaged without preservatives, which generally is a more attractive formulation for hummingbirds. The formula 101 may further be packaged without any other additives such as color. No further water or additives need to be added to make the formula consumable for hummingbirds.

As discussed above and shown in FIG. 4A, the feeder 100 is intended to be used in an orientation that allows nectar formula 101 to flow by force of gravity out through the opening 106. As shown in FIG. 1, the feeder 100 may be hung from the attachment member 124 so that that the opening 106 generally is positioned to allow nectar formula 101 by force of gravity to flow out through the opening 106. A valve, such as the dispensing member 200, may regulate the flow of nectar formula 101 out of the reservoir 104.

In some embodiments, the feeder 100 may comprise properties or qualities that make the product consumer-disposable. For instance, the materials used may have a low cost in the market, the manufacturing may have a low assembly cost, and the overall product and contents may be considered environmentally-friendly.

Figure 7:
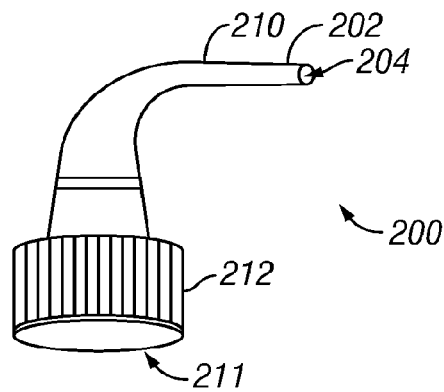
FIG. 7 is a front view of a nozzle member.

As shown in FIGS. 1, 4A, and 7, the feeder 100 may be configured to couple to a dispensing member 200 for dispensing the nectar formula stored in the reservoir 104 to hummingbirds, for instance. The dispensing member 200, shown in FIGS. 4A and 7, may function as a valve for regulating the flow of nectar solution out of the reservoir 104. In some embodiments, the dispensing member 200 may comprise a nozzle member 210 specifically engineered for dispensing the formula to a bird or other animal, and a connection member 212 for coupling the nozzle member 210 to the feeder 100. Threading on an inside surface of the connection member 212 may be designed or molded to threadably couple onto the connection interface 112 located around the opening 106 of the feeder 100. The connection member 212 may comprise a connection member opening 211 for providing an opening to allow nectar solution to flow from the opening 106 into the inner channel of the connection member 212. The nozzle member 210 may be manufactured from polypropylene or other suitable material.

Figure 5:
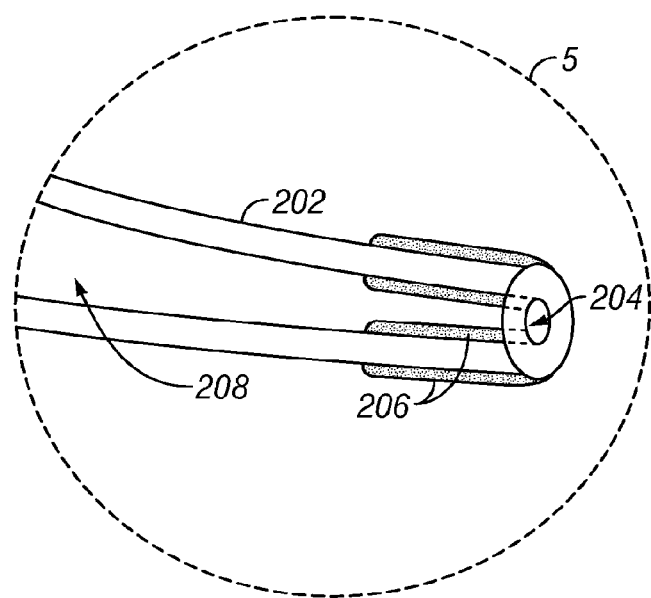
FIG. 5 is a close-up view of section "5" shown in FIG. 4A of a nozzle member.

As shown in FIGS. 4A and 5, the nozzle member 210 may comprise a tip portion 202 having a nozzle opening 204. A channel 208 between the connection member opening 211 and the nozzle opening 204 may provide a path for nectar solution to flow from the opening 106 of the feeder 100.

In some embodiments, inner surfaces of the nozzle opening 204 may be configured to prevent the flow of nectar solution, when the nozzle member 210 is in a non-actuated state, such as when a hummingbird is not presently attempting to feed from the nozzle member 210. The nozzle opening 204 may be configured with a size, shape, or other geometric feature designed to prevent the flow of nectar solution. For example, the size of the nozzle opening 204 may be configured to correspond with the expected flow properties, such as viscosity and thickness, of the nectar solution so that the nectar solution does not substantially drip out from the nozzle member 210 when a hummingbird is not drinking from the nozzle member 210. It should be understood by persons of ordinary skill that alternate techniques for preventing nectar solution from flowing through the nozzle opening 204, when the nozzle member 210 is undisturbed, may include use of a ball valve, or other suitable technique.

As shown in FIG. 5, the inside surfaces of the nozzle member 204 may be coated with hydrophobic material 206, for instance Teflon® (a trademark of DuPont of Wilmington, Del.). Use of material 206 as a coating may have the effect of preventing nectar solution from dripping out from the nozzle member 210 when the nozzle is substantially undisturbed by a hummingbird. Other hydrophobic materials, including silicon, may be used to prevent inadvertent flow of nectar solution from the nozzle member 210.

In some embodiments, the materials comprising the feeder 100 or the dispensing member 200, such as the layers 110, may have properties or qualities that make the feeder 100 consumer disposable. For instance, the materials used may have a low cost in the market, the manufacturing may have a low assembly cost, and the overall product and contents may be considered environmentally-friendly.

The feeder 100 and the dispensing member 200 may further comprise a one-use configuration. For instance, the dispensing member 200 may comprise a locking mechanism (not shown), which prevents removal of the dispensing member 200 without at least partial destruction of the dispensing member. A consumer therefore may be prevented from manually refilling the reservoir 104, without disabling the functionality of the apparatus 1000.

In some embodiments, the contents in the aseptic feeder 100 may be pressurized in some embodiments to form a vacuum seal or airtight seal at the aseptic seal.

The apparatus 1000 may be prepared for use by following one or more of these steps. First, the first sealing member 116 may be removed. In some embodiments, a cap member 113 may be turned to remove the cap member 113 from threadable engagement with the boss 114 to advance the opening member 115 to puncture the first sealing member 116 and provide for the flow of nectar solution from the reservoir. The cap member 113 may then be removed through further turning to disengage the cap member 113. Second, the dispensing member 200 may be attached to the interface 112 by threadably coupling the dispensing member 200 to the threading 117 on the boss 114, through rotation of the dispensing member 200. Third, the feeder 100 may be hung on a hook inserted into the aperture 130 of the hangar member 124. A hummingbird may then access the formula by disturbing the nozzle member 210 to release the formula. In some embodiments, when the nozzle member 210 is undisturbed by a hummingbird, a coating on the inner surfaces of the nozzle member 210 may substantially prevent inadvertent leakage of nectar formula in response to environmental disturbances, such as by wind or other unintended movements of the feeder 100 as it hangs.

A system 2000 for feeding birds may comprise a kit containing at least one feeder 100 containing formula for feeding birds or other animals, at least one dispensing member 200 configured to be removeably coupled to the at least one feeder, and at least one hangar member 124 configured for attachment to the feeder 100. In some embodiments, the at least one dispensing member 200 may be re-usable to be removeable and reattachable from a first feeder to a second feeder. In other embodiments, the at least one dispensing member 200 may comprise a one-use configuration. The hangar member 124 may in some cases be removeable and reattachable from a first feeder 100 to a second feeder (not shown).

Figure 8:
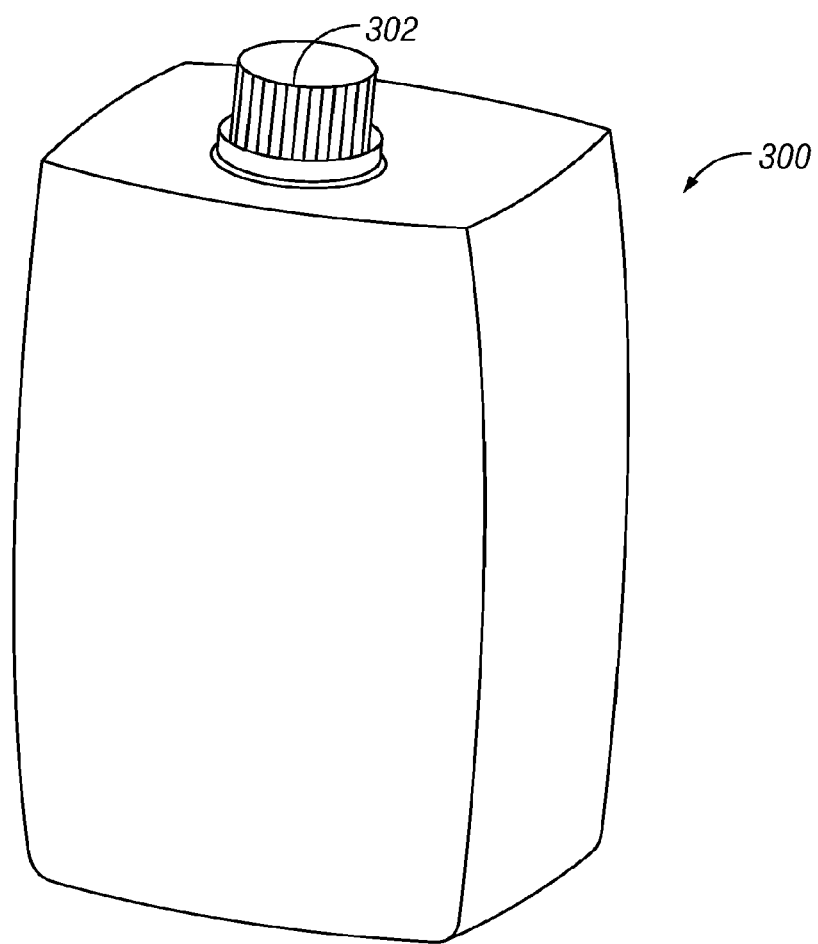
FIG. 8 is a perspective view of a refill package.

In other embodiments, the system 2000 may comprise one or more refill packages 300, as shown in FIG. 8. Such refill packages may be constructed according to the specifications of the feeder 100, including use of the methods and materials of the Tetra-Pak carton, for example, except that the refill packages 300 may not include the features of the feeder 100 provided for use as a hummingbird feeder, including the hangar member 124 and the dispensing member 200. The refill packages 300 may include a cap 302 that covers an opening. The cap may be removeable for opening the package 300 and accessing the feed solution stored inside. The refill packages 300 may be included in the system 2000 for refilling the reservoir of feeders 200 that are sold with a dispensing member 200 having a re-usable configuration. Alternatively, the refill packages 300 may be sold separately from the system 2000 or the apparatus 1000, as a refill option for consumers seeking to fill conventional hummingbird feeders.

Second Feeding Apparatus 3000

Figure 9:
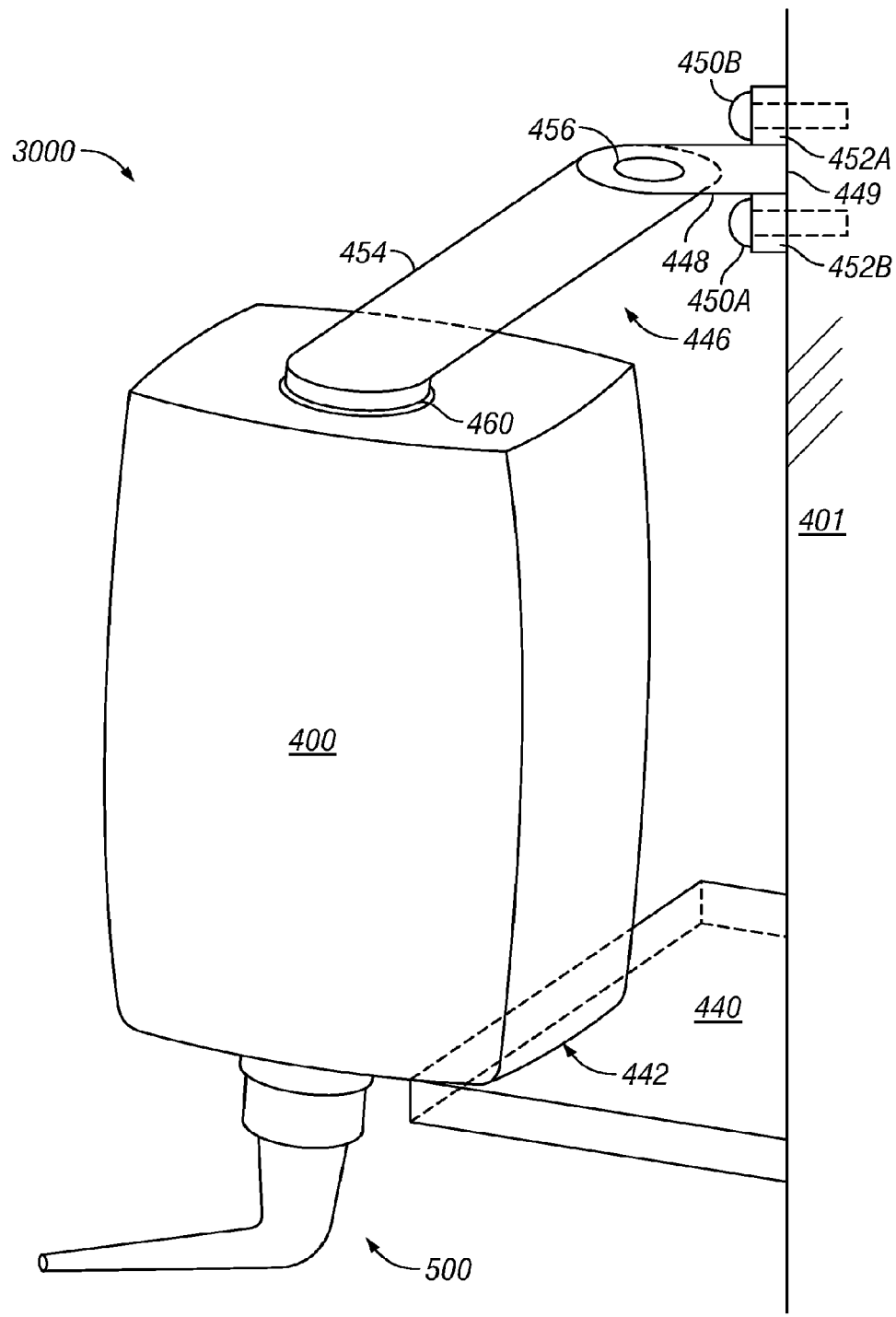
FIG. 9 is a perspective view of a second feeding apparatus in a first configuration.

As shown in FIG. 9, a second feeding apparatus 3000 for feeding a bird or other animals may comprise a second feeder 400 containing a formula adapted for feeding birds or other animals. The second feeder 400 may be configured to couple to a second dispensing member 500.

The second feeder 400 may incorporate the same or similar features of the feeder 100 described above and shown in FIGS. 1-4A, including but not limited to having walls with one or more layers (such as layers 110 described above and shown in FIGS. 2B and C) forming a reservoir containing or configured to contain a formula that is ready for consumption by birds or other animals (such as formula 101 shown in FIG. 4A). The second dispensing member 500 may incorporate the same or similar features of the first dispensing member 200, described and shown above in FIGS. 4, 5, and 7A, including but not limited to having a nozzle member, a nozzle tip coat with hydrophobic material, and a one-use configuration.

Figure 6:
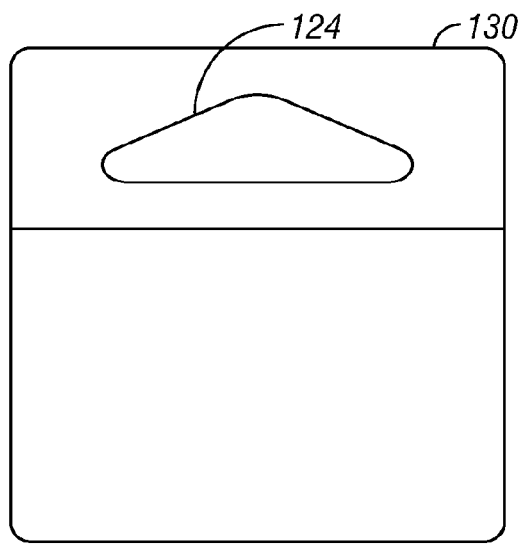
FIG. 6 is a front view of a hangar member.

In some embodiments, the second feeder 400 may exclude the hangar member 124, shown in FIGS. 1 and 6. Referring to FIG. 9, the second feeder 400 may be configured to be supported and stabilized for use in dispending the formula to birds by other attachment members or support means instead of the hangar member 124. The second feeder 400 may be configured to sit and be balanced on a surface, such as a ledge 440 or a table (not shown).

The second feeder 400 may be configured with an underlying support surface 442 extending on an outside wall of the second feeder. The support surface 442 may be configured to set onto the ledge 440. The surface of the ledge 440 may be substantially flat, as shown, allowing the second feeder 400 to balance on the ledge 440 when the support surface 442 is placed on the ledge 440. The support surface 442 may be configured with sufficient surface area to allow sufficient balancing to take place, and maintain the second feeder 400 in a first position configured to dispense feed solution from the dispensing member 500. It will be understood by persons of ordinary skill in the art that the surface of the ledge 440 may be grooved, have depressions, or other known mating configurations that support balancing of the second feeder 400.

When the second feeder 400 is placed on the ledge 440, the dispensing member 500 may be configured to extend in a direction that supports dispensing formula. For example, the dispensing member 500 may extend generally away from and downward relative to reservoir portion of the second feeder 400 to allow gravity to pull formula into the dispensing member 500. The support surface 442 may be configured to allow the dispensing member 500 to extend below the level of the ledge 440 so that the dispensing member 500 does not interfere with placement of the second feeder 400 on the ledge.

The second feeding apparatus 3000 may further comprise a first support holding device 446 configured to support balancing the second feeder 400 on the ledge 440. The first support holding device 446 may comprise a support arm 448 extending from a nearby rigid surface, such as wall surface 401. The support arm 448 may comprise a base 449 mounted to the wall surface 401 with fasteners, such as screws 450a and 450b, that extend through apertures in flanges 452a, b on the base 449. It will be understood that the fasteners may comprise other mechanisms for mounting the first support holding device 446 to the wall surface 401, including but not limited to using mechanical fasteners (e.g. clips, hooks, or snaps), chemical fastening (e.g. glue), magnetic fasteners, and suction devices (in cases where the wall surface is smooth and substantially porous-free, like glass).

The support arm 448 may comprise a pivot arm 454 that may be pivotally mounted to the base 449 by a hinge 456. The hinge 456 may be configured to frictionally couple the base 449 and the pivot arm 454 so that a degree of force must be applied to the pivot arm 454 to change its position relative to the base 449.

Figure 10:
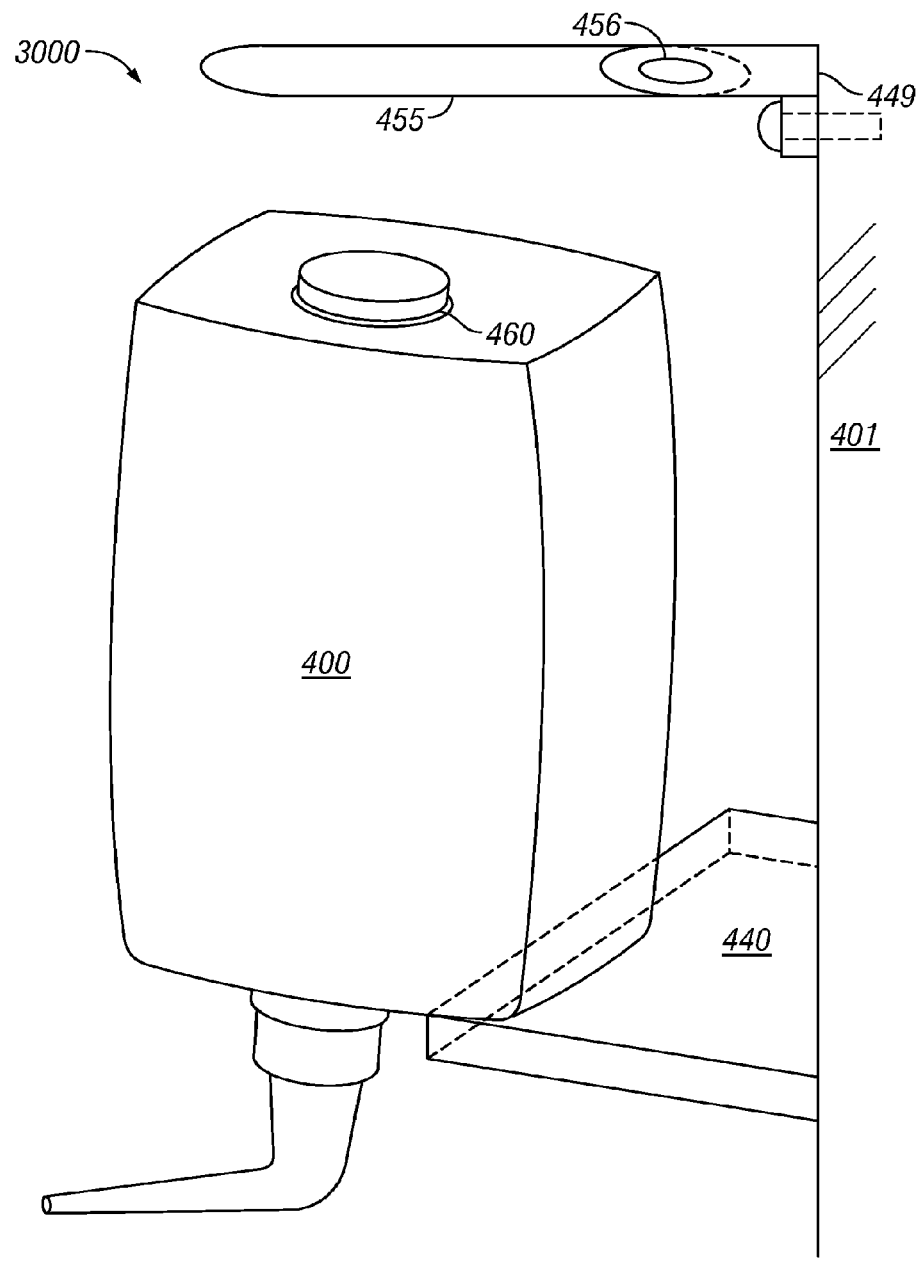
FIG. 10 is a perspective view of a second feeding apparatus in a second configuration.

As shown in FIG. 10, the pivot arm 454 may be raised to an open position for positioning, repositioning, or removing the second feeder 400 from its placement on the ledge 440. In FIG. 9, the pivot arm 454 is shown in a closed position where the pivot arm 454 is lowered to couple to a top surface 458 of a wall of the second feeder 400. The coupling between the pivot arm 454 and the top surface 458 may be configured to stabilize and support balancing the second feeder 400 on the ledge 440. For example, the pivot arm 454 may engage a retention feature, such as an indentation or depression 460 in the top surface 458. It will be understood by persons of ordinary skill in the art that the coupling may comprise a frictional, a mechanical, a magnetic, a chemical coupling, or other known fastening or other known coupling methods.

The depression 460 may be configured to hold the second feeder 400 in substantially an upright position, including in response to a force applied to the second feeder 400, such as from blowing wind, or from a bird or other animal making contact with the second feeder 400, including while feeding from the dispensing member. It will be understood that the retention feature may comprise other mechanisms for holding the second feeder 400 in substantially an upright position, including but not limited to using mechanical fasteners (e.g. clips, hooks, or snaps), chemical fastening (e.g. glue), or magnetic fasteners.

The resistance of the pivot arm 454 to move relative to base 449 provided in the hinge 456 may further provide support for the second feeder 400 in maintaining an upright orientation. It will be understood by persons of ordinary skill in the art that the frictional coupling in the hinge 456 may be replaced with other mechanisms that resist rotation in a hinge, including but not limited to ratcheting mechanisms and locks.

Third Feeding Apparatus 4000

Figure 11:
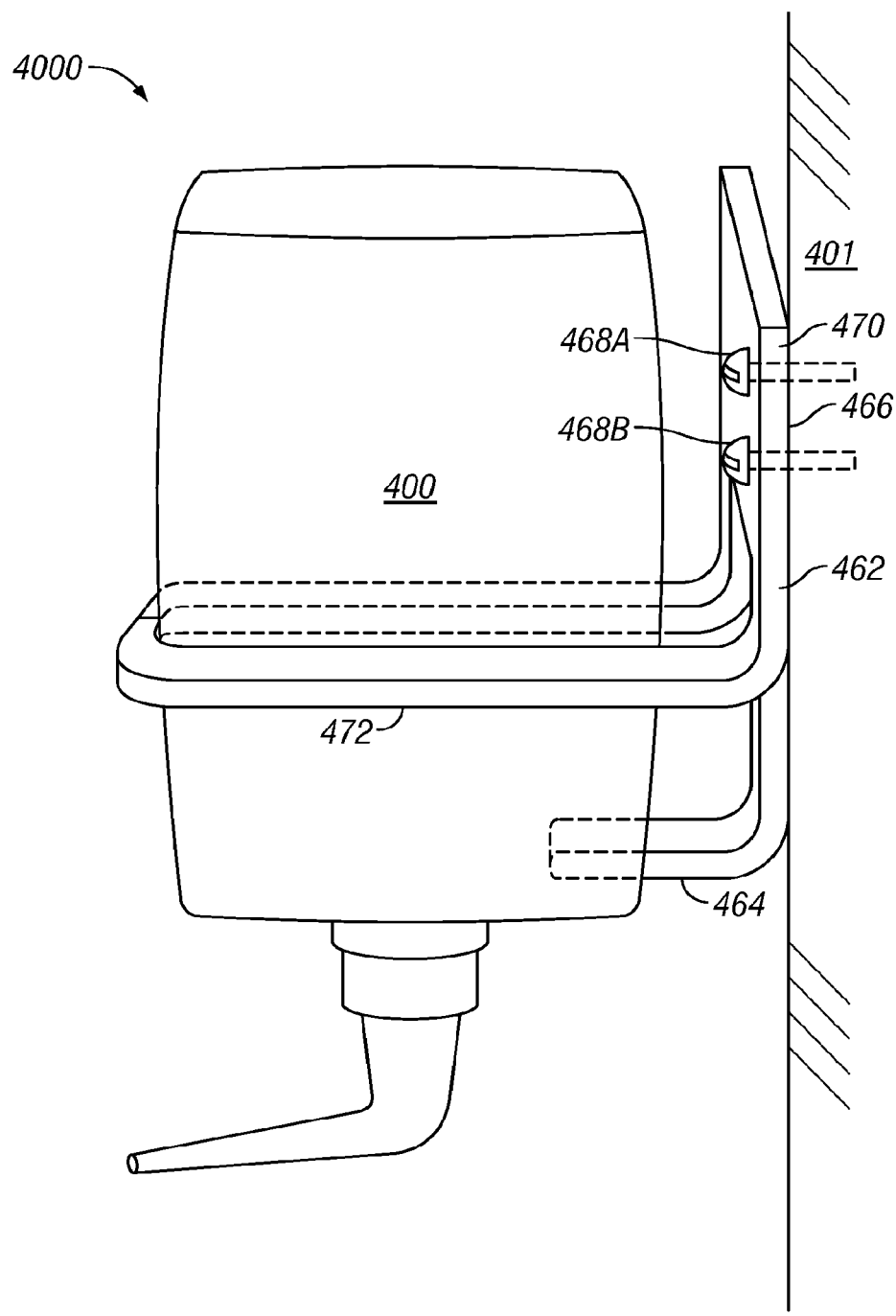
FIG. 11 is a perspective view of a third feeding apparatus.

Referring to FIG. 11, a third feeding apparatus 4000 may comprise the second feeder 400, as described above in FIGS. 9 and 10, except that the second feeder 400 may be further configured to set within a second support holding device 462. The second support holding device 462 may substantially perform the same or similar functions as the first support holding device 446 in maintaining the second feeder 400 in substantially an upright position to orient the dispensing member 500 for dispensing formula to birds or other animals.

Figure 20A:
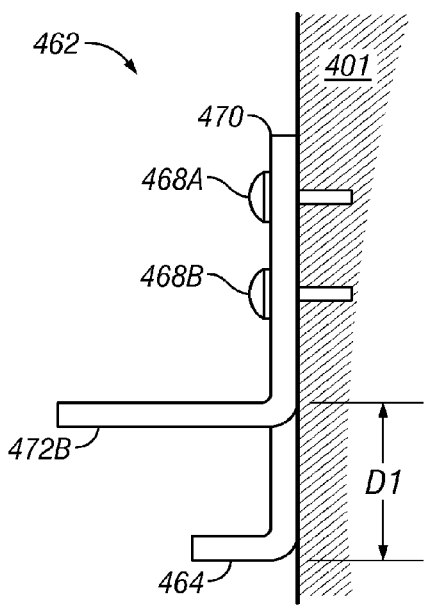
FIGS. 20A, 20B, and 20C are side view, front view, and top view of a bracket.
Figure 20B:
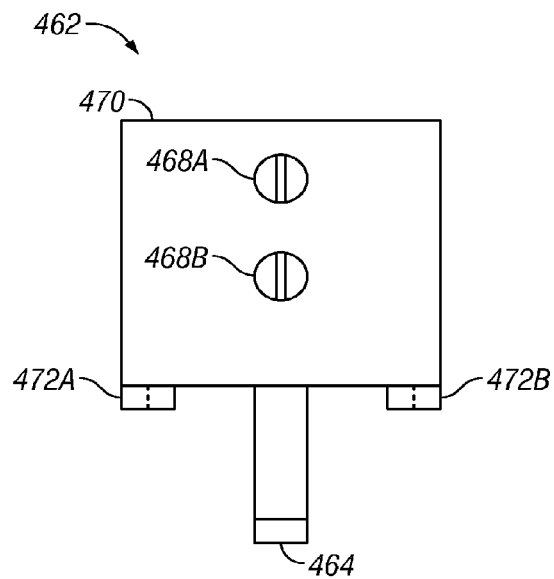
Figure 20C:
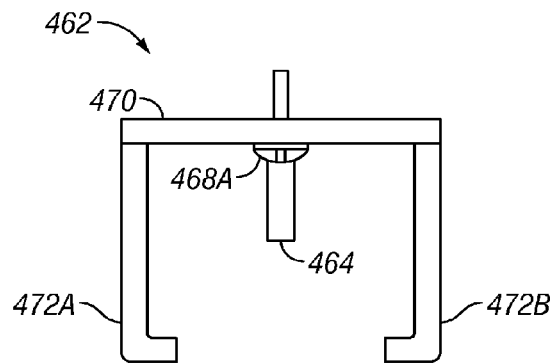

Referring to FIGS. 20A-C, the second support holding device 462, such as a bracket, may comprise a second base 466 mounted to the wall surface 401 with fasteners, such as screws 468a and 468b, that extend through apertures in the second base 466 and into the wall surface 401. It will be understood that the fasteners may comprise other mechanisms for mounting the second support holding device 462 to the wall surface 401, including but not limited to using mechanical fasteners (e.g. clips, hooks, or snaps), chemical fastening (e.g. glue), magnetic fasteners, and suction devices (in cases where the wall surface is smooth and substantially porous-free, like glass).

The underlying support surface 442 may be configured to sit on and be supported on a support arm 464 extending from the second base 466 of the second support holding device 462 and configured to extend from the wall surface 401. An extension arm 472 may extend from the second base 466 and extend from the wall surface 401 at a position offset dl from where the support arm 464 extends from the wall surface 401.

Figure 12A:
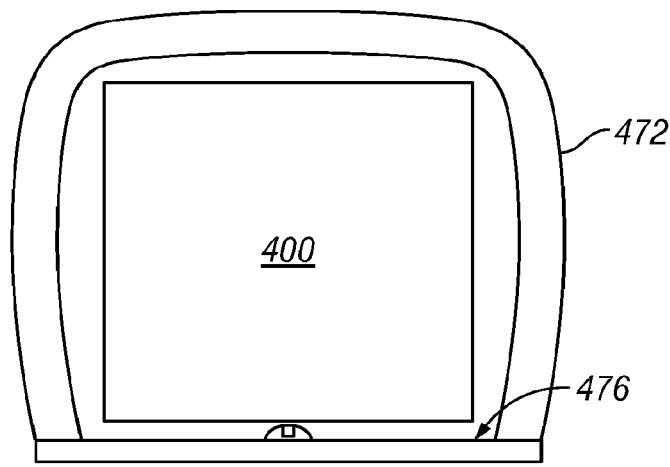
FIGS. 12A, 12B, and 12C are three configurations of an extension arm for a third feeding apparatus.
Figure 12B:
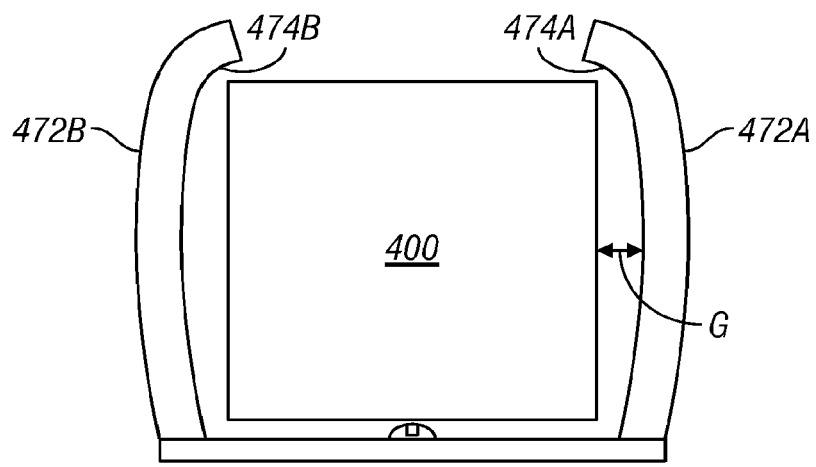

As shown in FIG. 12B, the extension arm 472 (shown in two parts 472a and 472b) may be configured to extend around at least a portion of the side walls of the second feeder 400. The extension arm 472 may extend along at least two opposing sides to stabilize the second feeder 400 on the underlying support surface 442. The extension arm 472 may further comprise one or more hook portions 474a, b that are configured to extend around the second feeder 400 from one adjacent side of the second feeder 400 to another. As shown in FIG. 12A, the extension arm 472 extends around the second feeder 400 to form a closed shape with a back portion 476 of the second base 466.

Figure 12C:
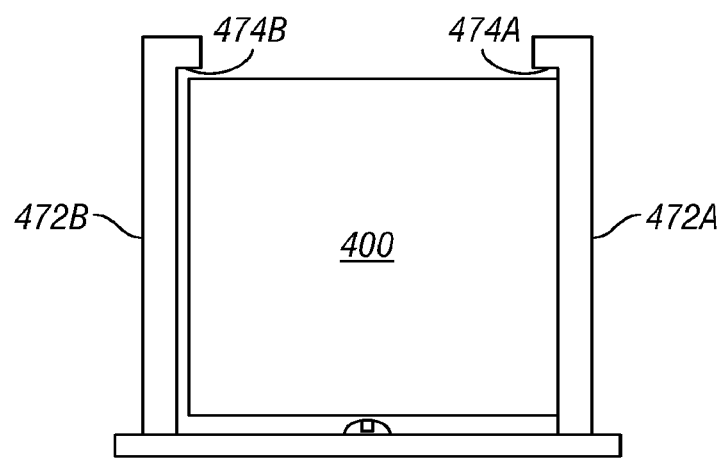

In some embodiments shown in FIGS. 12A and 12B, the extension arm 472 may be configured to have a gap g between the inner surface of the extension arm 472 and the outer surface of the second feeder 440. The gap g may allow some movement, for example tilting, of the second feeder 440. As shown in FIG. 12C, the extension arm 472 may be configured to contact at least portions of the outer surface of the second feeder 440 to reduce tilting and maintain the second feeder 440 in a substantially upright position. In some embodiments, the second feeder 440 may be fit snugly within the extension arm 472.

Fourth Feeding Apparatus 5000

Figure 13:
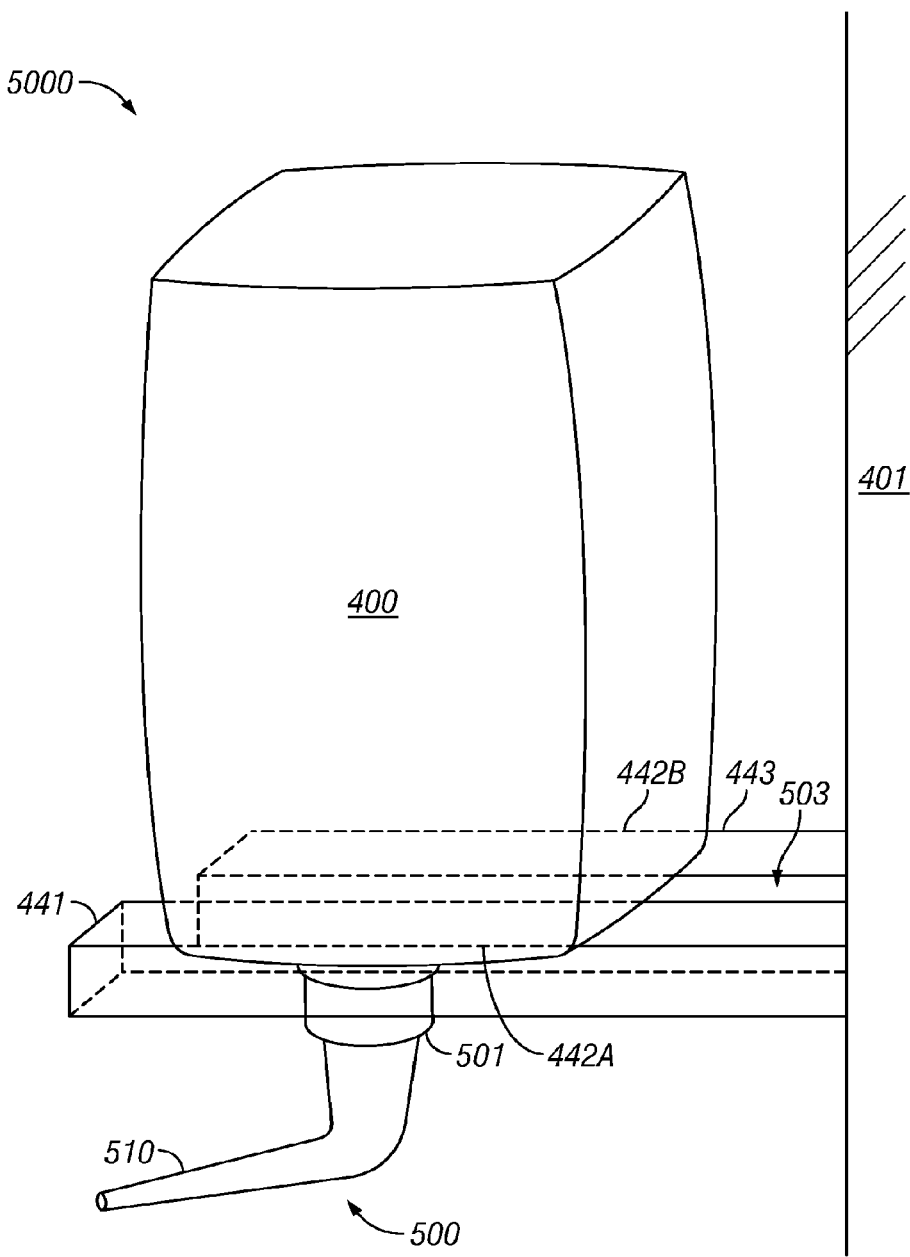
FIG. 13 is a perspective view of a fourth feeding apparatus.

Referring to FIG. 13, a fourth feeding apparatus 5000 may comprise the second feeder 400, as described above in FIGS. 9 and 10, except that the apparatus 5000 may not include, in some embodiments, either the first or second support holding device 446, 462, respectively. The second feeder 400 may be configured to set up and stand in a substantial upright position, at least in part, between a slot or groove in a platform surface, such as in gap 503 extending between two slats in a shelf or table. In some embodiments, the second feeder 400 may be adapted to be free-standing on a substantially rigid surface, such as a table or a shelf, without the need for other hardware, such as brackets or fasteners.

Referring to FIG. 13, the underlying support surface 442 (shown divided into two parts 442a and 442b) may be configured to sit on one or more of top surfaces of the slats 441, 443 to support balancing the second feeder 400 and keeping the second feeder 400 in a substantially upright position. In some embodiments (not shown), an additional support, such as the first support holding device 446 shown in FIG. 9, may be added to further support the second feeder 400.

Figure 14:
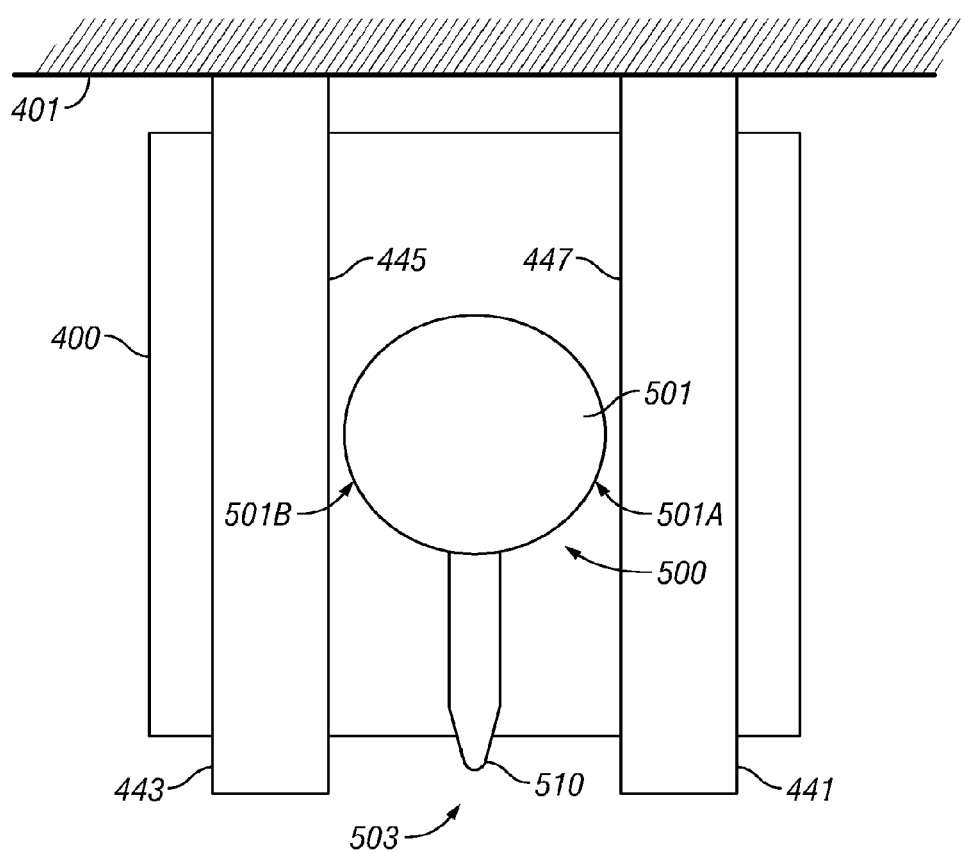
FIG. 14 is a bottom view of a fourth feeding apparatus.

Referring to FIG. 14, the dispensing member 500 may comprise a second connection member 501, which may be configured to fit in the gap 503 between a first slat 441 and a second slat 443, extending on a substantially rigid platform surface, such as a shelf extending from the wall 401, or a table top (not shown). In some embodiments the second connection member 501 comprises a substantially cylindrical shape.

Referring to FIG. 13, a nozzle portion 510 of the dispensing member 500 may be configured to extend beneath the slats 441, 443 and to clear the slats sufficiently to allow birds or other animals to feed from the formula dispensed by the dispensing member 500. As shown in FIG. 13, the nozzle portion 510 may extend down and away from the slats 441, 443 to provide access for feeding.

Referring to FIG. 14, the gap 503 may comprise opposing walls 445, 447 extending to form a neck that constricts tilting movement of the second feeder 400. Sides 501a and 501b of the second connection member 501 may be configured to contact portions of the inner walls 445, 447, respectively, of the gap 503 between the slats 441, 443 to prevent the second feeder 400 from tipping over, including preventing tipping or falling when the second feeder 400 is pushed by an external force such as wind or a bird or animal. In some embodiments, the dispending base 501 is configured to make constant contact, such as in an interference fit, with the two slats 441, 443. It will be understood by persons of ordinary skill in the art that one or both of the sides 501a, 501b of the second connection member 501 or the inner walls 445, 447 of the slats 441, 443 may comprise a shape, such as flat or correspondingly mating, to provide increased surface area for preventing tipping or falling of the second feeder 400.

Fifth Feeding Apparatus 6000

In other embodiments, the second feeder 400 may be propped or leaned against a wall, a stand, or other rigid surface configured to support the second feeder 400 in an orientation (e.g. substantially vertical) for allowing formula to flow out from the dispensing member 500. A fifth feeding apparatus 5000, shown in FIG. 18, may comprise a stand 480 for supporting the second feeder 400.

Figure 18:
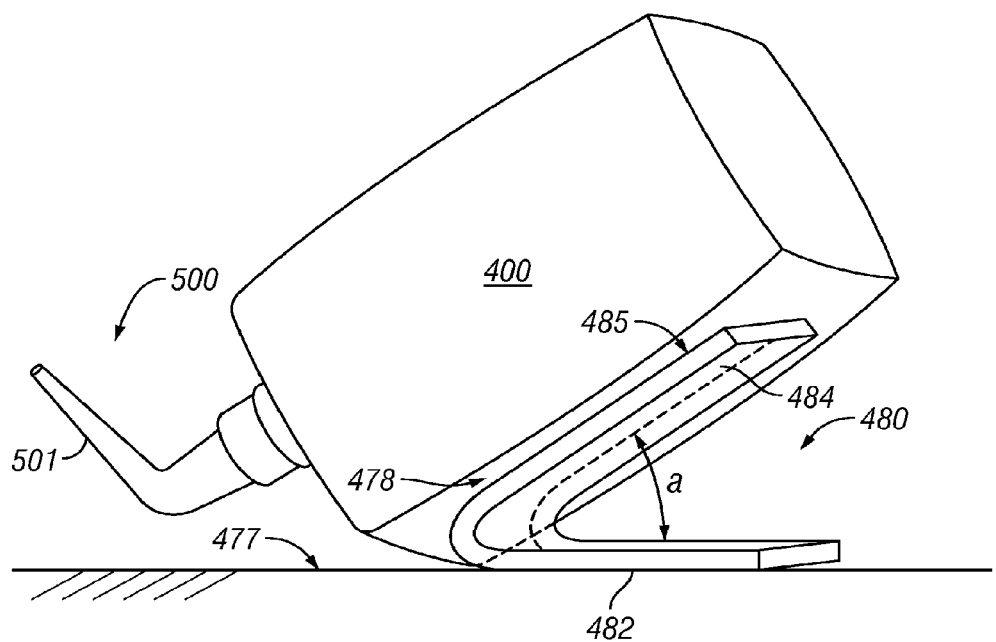
FIG. 18 is a perspective view of a fifth feeding apparatus.
Figure 19:
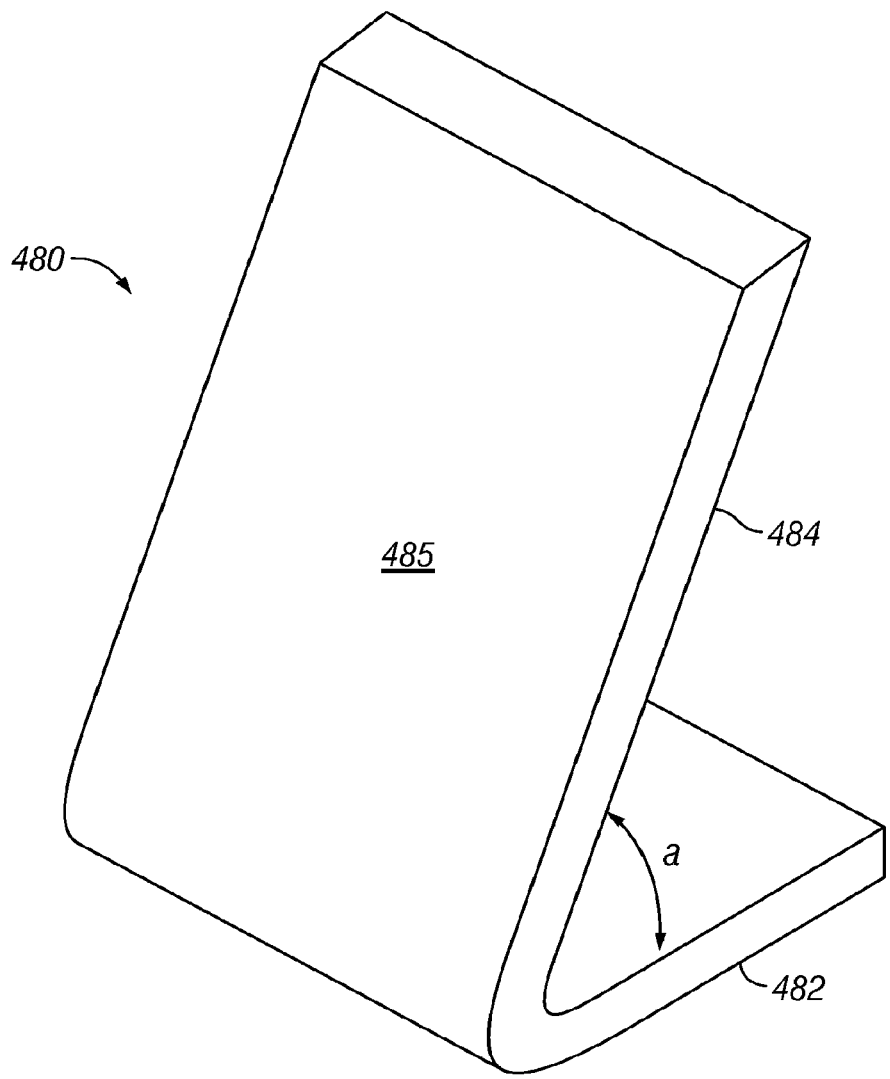
FIG. 19 is a perspective view of a stand.

Referring to FIGS. 18 and 19, the stand 480 may comprise a stand support member 484 having a support surface 485 for receiving a side portion 478 of the second feeder 400. A stand base 482 may extend from the support member 484 to provide a sturdy and stable support for the support member 484 and the second feeder 400. In the embodiment shown in FIG. 18, the stand base 482 extends substantially horizontally along an undersurface 477 to provide support to the support member 484.

The second feeder 400 may be set on to or attached to the support member 484 to contact the support surface 485. The support surface 485 may be configured to orient the second dispensing member 500 for dispensing formula through the nozzle member 510. As shown in FIG. 18, the support surface 485 may extend at an angle α relative to the stand base 482. The angle α may be configured to position the second feeder 4000 in a substantially vertical position. It will be understood by persons of ordinary art that the angle α may be other than 90 degrees and may be varied to accommodate the flow of formula from the nozzle member 510.

Third Dispensing Member 520

The feeder 100 (shown in FIG. 1) and the second feeder 400 (shown in FIGS. 9, 11, and 13) may be configured to couple to a third dispensing member 520, and may be configured to be interchangeable with the dispensing member 200 and the second dispensing member 500. The third dispensing member 520 may be configured to dispense formula to more than one bird or other animal at a time. The third dispensing member 520 may further be included as part of the system 2000 for feeding birds, described above, sold with the feeder 100 or second feeder 400, or sold separately.

Figure 15:
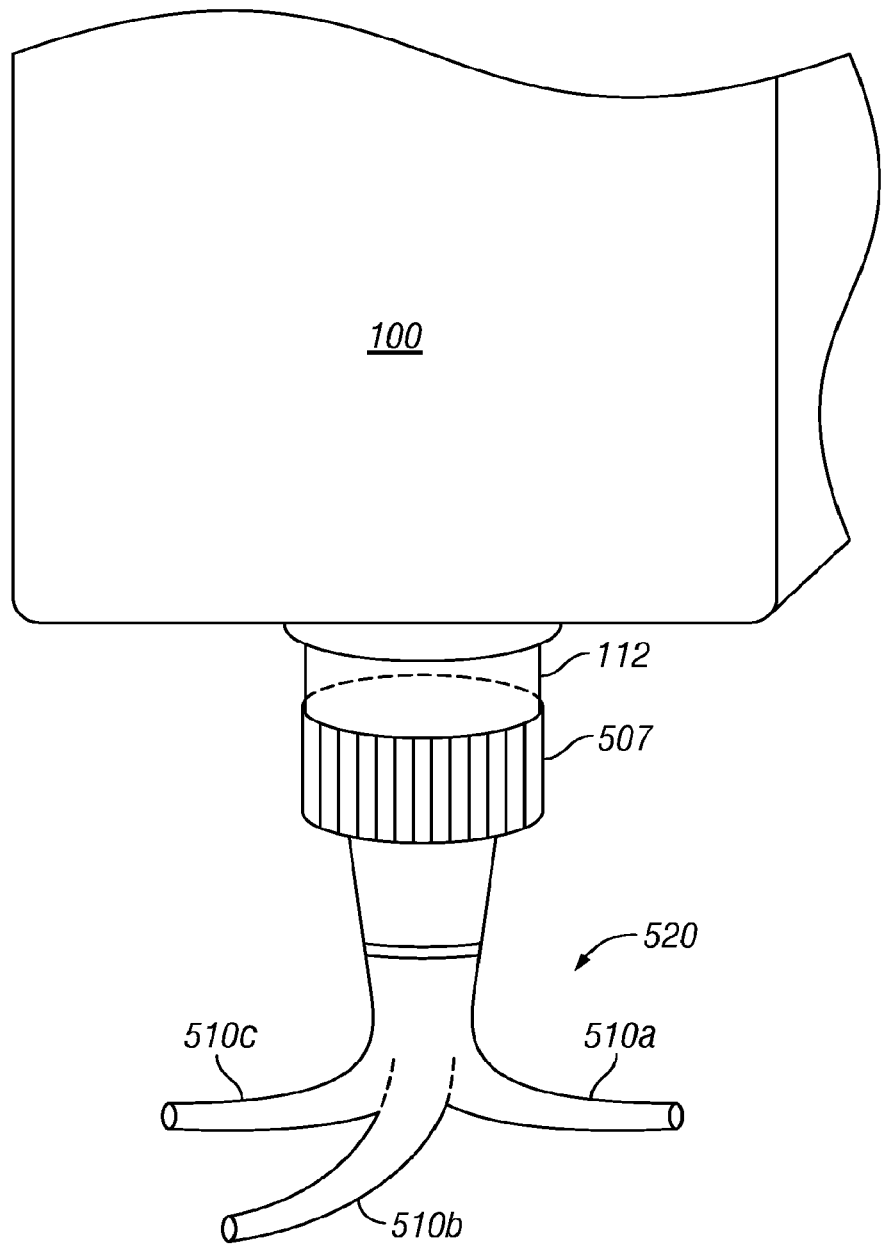
FIG. 15 is a perspective view of a second dispensing member.

Referring to FIG. 15 showing by example the feeder 100, the connection interface 112 may be configured to couple to a third connection member 507 of the third dispensing member 520.

The third dispensing member 520 may comprise two or more nozzle members 510a, 510b, 510c extending from the third connection member 507. Each nozzle member 510a, 510b, 510c may be specifically engineered for dispensing the formula to a bird or other animal. Each nozzle member 510a, 510b, 510c may be configured with the same or similar features as those described for nozzle member 210, described above and shown in FIGS. 1, 4A, and 5. The third dispensing member 520 may be configured with nozzle members 510a, 510b, and 510c to allow two or more birds or other animals to feed at the same time without interfering with one another.

Second Refill Package 600

A second refill package 600 may be configured to transport and deliver the formula 101 to the consumer for use in the feeder 100 and/or the second feeder 400, or in other hummingbird feeders. The second refill package 600 may further be included as part of the system 2000 for feeding birds, described above, or sold separately.

The second refill package 600 may be constructed according to the same or similar specifications of the feeder 100 or the refill package 300 (shown in FIG. 8), including use of the methods and materials of the Tetra-Pak carton, with some noted differences described here. Referring to FIG. 16, the refill package 600 may comprise a hinged cap 602 that provides access for a user to open the second refill package 600 and pour out the formula 101 (shown in FIG. 17B) stored inside.

Figure 17C:
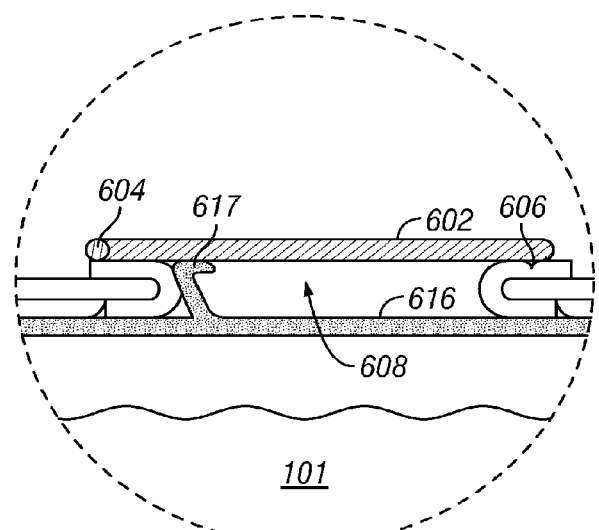

Referring to FIGS. 17A, 17B, and 17C, the hinged cap 602 may be coupled to the walls of the second refill package 600 by a cap hinge 604. The hinged cap 602 may be moved from a closed to an open position (not shown). A locking member 606 may keep the hinged cap in place for transport and storage of the formula within the closed container of the refill package 600. In some embodiments, the locking member 606 may comprise a snap lock. It will be understood by persons of ordinary skill in the art that the locking member 606 may comprise other known locking mechanisms, including but not limited to latches, screws, clips, magnets, and adhesives.

A refill sealing member 616 may span an opening 608 in the second refill package 600. The lip 601 forming the opening 608 may comprise a spout for pouring the formula 101 out of the refill package 600. Formula 101 may be poured into a separate container, such as, but not limited to, the feeder 100 and/or the second feeder 400, or in other bird or animal feeders for refilling the container or replacing old feeding formula.

The refill sealing member 616 may comprise a membrane formed from aluminum foil, or other suitable material, to allow removal or puncturing of the refill sealing member 616. In FIG. 17C, a pull tab 617 may extend from a portion of the refill sealing member 616. A user may pull the pull tab 617 to remove the refill sealing member 616 to allow formula 101 to be poured from the opening 608 of the second refill package 600.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

I claim:

1. An apparatus for feeding birds comprising:
a reservoir containing a ready-to-consume and preservative free feed solution for birds, wherein walls of the reservoir comprise at least a first layer comprising a barrier to light, oxygen, and flavor enclosing the feed solution in a substantially sealed environment, wherein the first layer comprises a metal, and wherein the reservoir comprises a second layer selected from a paper layer and a plastic layer.

2. The apparatus of Claim 1, further comprising:
an opening in the reservoir for pouring a feed solution into a container.

3. The apparatus of claim 2, further comprising:
an interface extending from the opening in the reservoir, wherein the interface is configured to couple to a dispensing member for dispensing feed solution to hummingbirds in response to actuation of the dispensing member.

4. The apparatus of claim 3, further comprising:
a dispensing member coupled to the interface for dispensing a feed solution to birds in response to actuation of the dispensing member.

5. The apparatus of claim 1,
wherein the first layer comprises aluminum.

6. A feeding apparatus comprising:
a reservoir containing a ready-to-consume and additive free feed solution for non-human animals, wherein walls of the reservoir comprise at least a first layer comprising a barrier to light, oxygen, and flavor enclosing the feed solution in a substantially sealed environment, wherein the first layer comprises a metal, and wherein the reservoir comprises a second layer.

7. The feeding apparatus of claim 6, further comprising:
an opening in the reservoir for pouring a feed solution into a container.

8. The feeding apparatus of claim 7, further comprising:
an interface extending from the opening in the reservoir, wherein the interface is configured to couple to a dispensing member for dispensing feed solution to hummingbirds in response to actuation of the dispensing member.

9. The feeding apparatus of claim 8, further comprising:
a dispensing member coupled to the interface for dispensing a feed solution to birds in response to actuation of the dispensing member.

10. The feeding apparatus of claim 6,
wherein the ready-to-consume and additive free feed solution for non-human animals comprises a feed solution for birds.

11. The feeding apparatus of claim 10,
wherein the ready-to-consume and additive free feed solution for non-human animals comprises a feed solution for hummingbirds.

12. The feeding apparatus of claim 6,
wherein the ready-to-consume and additive free feed solution for non-human animals is substantially free from preservatives as an additive.

13. The feeding apparatus of claim 6,
wherein the ready-to-consume and additive free feed solution for non-human animals is substantially free from artificial color as an additive.

14. The feeding apparatus of claim 6,
wherein the ready-to-consume and additive free feed solution for non-human animals is substantially free from electrolytes as an additive.

15. The feeding apparatus of claim 6,
wherein the second layer is selected from a paper layer and a plastic layer.

16. The feeding apparatus of claim 15,
wherein the first layer comprises aluminum.

17. A feeding apparatus comprising:
a reservoir containing a ready-to-consume and additive free feed solution for non-human animals, wherein the feed solution is free from preservatives, artificial color, and electrolytes, as additives;
wherein walls of the reservoir comprise at least a first layer comprising a barrier to light, oxygen, and flavor enclosing the feed solution in a substantially sealed environment, wherein the first layer comprises aluminum, and wherein the reservoir comprises a second layer selected from plastic and paper; and
an opening in the reservoir for pouring a feed solution into a container.

18. The feeding apparatus of claim 17, further comprising:
an interface extending from the opening in the reservoir, wherein the interface is configured to couple to a dispensing member for dispensing feed solution to hummingbirds in response to actuation of the dispensing member.

19. The feeding apparatus of claim 18, further comprising:
a dispensing member coupled to the interface for dispensing a feed solution to birds in response to actuation of the dispensing member.

20. The apparatus of claim 19, further comprising:
wherein the ready-to-consume and additive free feed solution for non-human animals is substantially free from the selection of one of the following preservatives: citric acid, sodium citrate, citrate, sodium benzoate, sorbic acid, tartaric acid, potassium sorbate, and bezoic acid as an additive.

* * * * *